United States Patent
Nishikado et al.

(10) Patent No.: US 6,572,025 B1
(45) Date of Patent: Jun. 3, 2003

(54) INFORMATION CODE PRODUCT, MANUFACTURING DEVICE AND METHOD FOR MANUFACTURING THE SAME, INFORMATION CODE READING DEVICE, AUTHENTICATION SYSTEM, AUTHENTICATION TERMINAL, AUTHENTICATION SERVER, AND AUTHENTICATION METHOD

(75) Inventors: Hiroshi Nishikado, Bunkyo-ku (JP); Satoshi Shimazaki, Bunkyo-ku (JP); Tatahiro Miwa, Bunkyo-ku (JP)

(73) Assignee: Japan Gain The Summit Co., Ltd., Tokyo (JP)

( * ) Notice: Subject to any disclaimer, the term of this patent is extended or adjusted under 35 U.S.C. 154(b) by 124 days.

(21) Appl. No.: 09/664,054

(22) Filed: Sep. 18, 2000

(30) Foreign Application Priority Data

| | | |
|---|---|---|
| May 10, 2000 | (JP) | 2000-137541 |
| Jul. 27, 2000 | (JP) | 2000-227602 |
| Aug. 18, 2000 | (JP) | 2000-248769 |

(51) Int. Cl.$^7$ .......................... G06K 19/06; G06K 7/12; G06K 9/18; G06K 7/10
(52) U.S. Cl. ............... 235/494; 235/462.09; 235/462.1; 235/468; 235/469
(58) Field of Search .................. 235/462.09, 462.1, 235/468, 469, 494

(56) References Cited

U.S. PATENT DOCUMENTS

| | | | | |
|---|---|---|---|---|
| 5,050,207 A | * | 9/1991 | Hitchcock | 379/96 |
| 5,337,361 A | * | 8/1994 | Wang et al. | 380/51 |
| 5,828,772 A | * | 10/1998 | Kashi et al. | 382/119 |
| 6,104,812 A | * | 8/2000 | Koltai et al. | 380/51 |
| 6,327,395 B1 | * | 12/2001 | Hecht et al. | 382/306 |
| 6,400,827 B1 | * | 6/2002 | Rhoads | 382/100 |
| 6,438,251 B1 | * | 8/2002 | Yamaguchi | 382/100 |

FOREIGN PATENT DOCUMENTS

| | | | | |
|---|---|---|---|---|
| JP | A 8-96097 | 4/1996 | | |
| WO | WO 99/35819 | * | 7/1999 | H04N/1/32 |

* cited by examiner

*Primary Examiner*—Karl D. Frech
*Assistant Examiner*—Daniel A. Hess
(74) *Attorney, Agent, or Firm*—Oliff & Berridge, PLC

(57) ABSTRACT

An information code product (101) comprising a body (105) having a code-including image (104) formed thereon which includes at least one unit of information codes (103) with one or more specific color, wherein the unit of information codes is adapted to be obtained by extracting an image with the specific color from the code-including image. A user is authenticated by an authentication system (301) which comprises an authentication terminal (302) for reading data included in the product (101) and an authentication server (303) which is interconnected to the authentication terminal through a network (304).

11 Claims, 16 Drawing Sheets

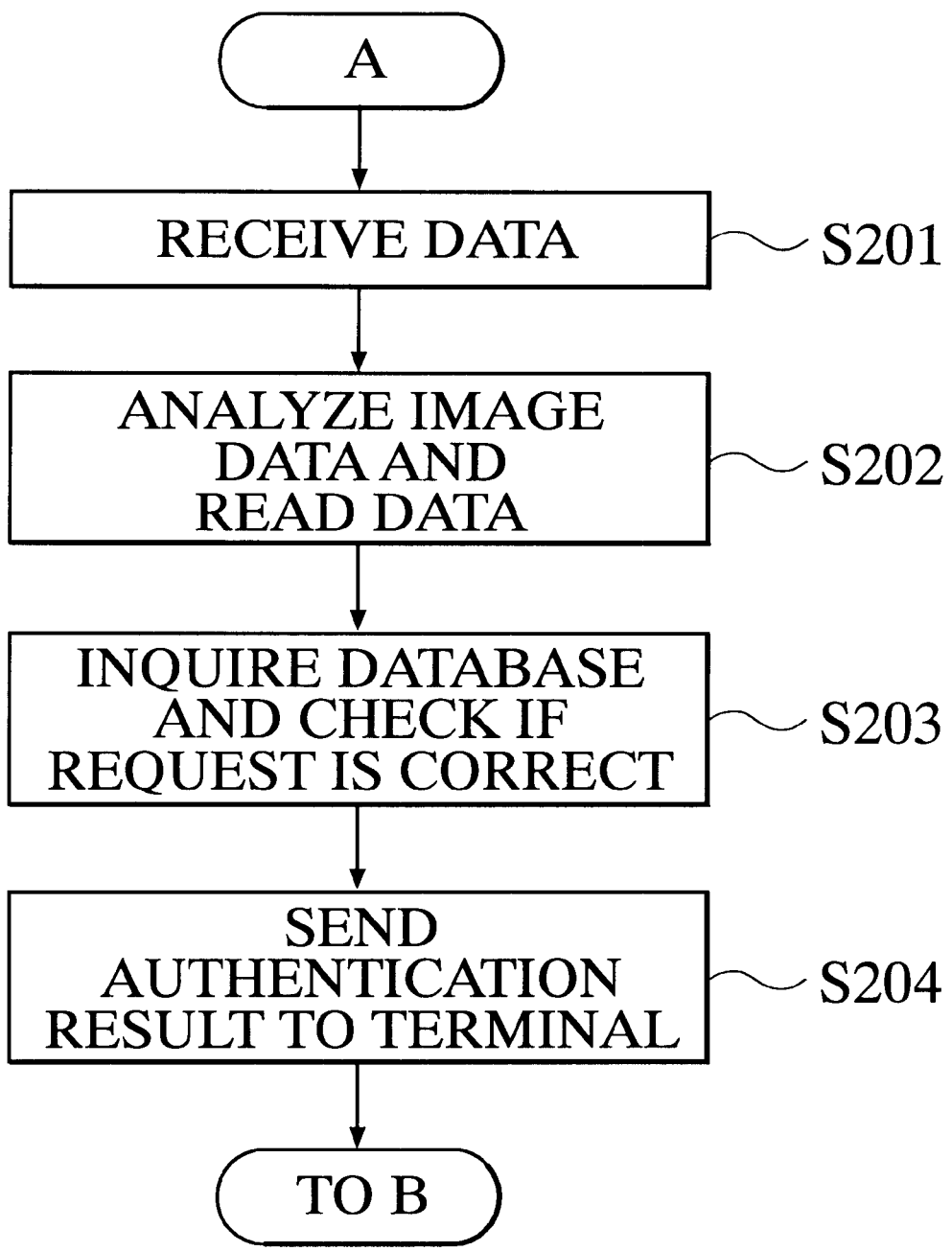

//  INFORMATION CODE PRODUCT, MANUFACTURING DEVICE AND METHOD FOR MANUFACTURING THE SAME, INFORMATION CODE READING DEVICE, AUTHENTICATION SYSTEM, AUTHENTICATION TERMINAL, AUTHENTICATION SERVER, AND AUTHENTICATION METHOD

BACKGROUND OF THE INVENTION

1. Field of the Invention

The present invention relates to an information code product which includes information codes having predetermined coded information, a device and a method, for manufacturing the information code product, an information code reading device for reading the information codes, e.g., two-dimensional bar codes, on the information code product, and to an authentication system for identifying the user of an information code product, e.g., a card, by using the information code product, an authentication terminal, an authentication server, and an authentication method.

2. Description of Related Art

As information codes including predetermined coded information, black and white bar codes consisting of black bars in a white background are generally known.

Recently, two-dimensional bar codes, color bar codes (for example, as shown in Japanese Patent Publication No. Tokukai-hei-8-96097) and the like are also used, in order to increase the amount of information included therein.

As an information code article including much information, for example, a magnetic card used for a credit card and the like is also known.

However, although the information in conventional bar codes or in a conventional credit card are coded, there is a danger of performing information decoding by a third person because the information itself is exposed to the outside and therefore has only a little secrecy.

As a result, it was difficult to construct a good information management system by using information codes such as bar codes, in a field to which a strict information secrecy is required.

In conventional bar codes or a conventional magnetic card, there is a problem of small information capacity and limitation on design. Conventional bar codes have a further problem of exhaustion of patterns for themselves.

As a personal information medium which comprises a card including coded personal identifying information therein, a credit card is generally known. Coded information are hidden in, for example, black and white bar codes, two dimensional bar codes, a magnetic tape, an IC chip and the like.

In order to conduct a transaction by a credit card, the codes in the card are read by using a reading device for credit card exclusive use, the read codes information are sent to a card company to check if the request is correct, and a signature on a slip is required to the user of the card, to check if the user is the owner of the card.

However, although the information in conventional bar codes, a magnetic tape, an IC chip or the like are coded, there is a danger of performing information decoding by a third person because the information itself is exposed to the outside and therefore has only a little secrecy. There are also dangers of the reading device being converted, of a leakage of information by interruption into the line.

Recently, damage according to an illegal use of forged card increases because it is easy to forge a card with a magnetic tape or an IC chip by rewriting therein. Damage according to an illegal use of lost or stolen card by a third person also increases because it is easy for every person to imitate the owner's signature which is exposed on the card.

SUMMARY OF THE INVENTION

The invention has been made in view of the above problems.

It is an object of the invention to provide an information code product which includes information codes having predetermined coded information, an apparatus and a method, for manufacturing the information code product, and an information code reading device for reading the information codes on the information code product.

It is another object of the invention to provide an authentication system for identifying the owner of an information code product, e.g., a card, by using the information code product, an authentication terminal, an authentication server, and an authentication method, which improve security for the information codes.

The present invention was developed in view of the above-described problems.

In accordance with one aspect of the present invention, the information code product (e.g., bar code sticker 101) comprises a body (e.g., paper 105 for printing) having a code-including image (104) formed thereon which includes at least one unit of information codes (e.g., two-dimensional bar codes 103) with one or more specific color, wherein the unit of information codes is adapted to be obtained by extracting an image with the specific color from the code-including image.

According to the information code product, because the unit of information codes with one or more specific color is included in the image, any person cannot obtain the information codes unless the person knows the specific color. Accordingly, it is possible to improve security for the information codes.

That is, because the information codes are hidden in the image, and therefore the information codes cannot be recognized by just seeing the code including image. Therefore, the information code product according to the invention provides excellent security in comparison with a product having exposed information codes, e.g., a conventional two-dimensional bar codes product, a magnetic card or the like.

Therefore, such information codes enable use in a technical field which requires information security strictly.

An image may include a plurality of units of information codes with different specific color. Accordingly, it is possible to increase the amount of information included in the image and further to increase information security.

Further, it is possible to increase information security by using a unit of information codes such as two-dimensional bar codes, which has a combination of a plurality of specific colors.

Herein, the term "information codes" includes any of coded information, e.g., one-dimensional bar codes, two-dimensional bar codes, hologram or the like.

The term "specific color" may be a desired color which is determined, for example, by changing the mixture ratio of cyan, magenta, yellow and black, and the like.

The term "information code product" means every product on the surface of which an image with information codes are formed, that is, it includes a card or sticker of plastic, paper or the like, e.g., a company ID card, a cash card for bank and the like, goods, a container or a rapping paper for goods, and the like.

The term "image" may be a desired one, and includes one according to a picture of portrait, scenery, or the like, and may be one created factitiously such as a mosaic image.

The term "image including information codes may be synthesized image data of prepared information codes and data of an original image captured from a picture or the like, or original image data such as a picture or the like, from which information codes with a specific color were created.

Preferably, the code-including image comprises a synthesis of an original image (e.g., scenic image 102) and at least one unit of information codes with one or more specific color.

According to the information code product, it is possible to prepare the code-including image easily and to improve the application flexibility. It is possible to use the same information codes to different data of original pictures.

Preferably, the unit of information codes is a unit of two-dimensional bar codes with the one or more specific color.

According to the product having such a construction, because the information codes comprise a unit of two-dimensional bar codes, it is possible to increase the information amount therein and to prepare the code-including image easily.

Preferably, the unit of information codes is split into plural pieces, and the split pieces (207a–207d) of information codes (e.g., two-dimensional bar codes 207) are arranged in desired regions (202a–202d) at desired positions in the code-including image on the body (e.g., card substrate 203) and are adapted to obtain the unit of information codes by extracting pieces of images with the specific color from the code-including image in the desired regions at the desired positions and combining the pieces of images extracted.

In the information code product according to the invention, because the unit of information codes is split into plural pieces and the split pieces of information codes are arranged in desired regions at desired positions in the code-including image, any person cannot obtain the information codes unless the person knows all of the arrangement positions and regions of the split pieces of information codes, the arrangement relationship between the split pieces to be combined, and the specific color. Accordingly, it is possible to improve security for the information codes.

That is, because the information codes are split in pieces and are hidden in the image, and therefore the entirety of the information codes cannot be obtained until combining the split pieces of information codes appropriately, the information code product according to the invention provides excellent security in comparison with a product having exposed information codes, e.g., a conventional two-dimensional bar codes product, a magnetic card or the like.

It is also possible to increase flexibility for design of the product because the split of information codes can be arranged at desired positions on the original image.

The positions and regions at which information codes are arranged may be predetermined or may be changed by using random number on the basis of a user's password or the like, or may be changed freely according to the user's preference.

Preferably, at least one of the split pieces of information codes is scaled down.

According to the information code product having such a structure, because no person can obtain the correct unit of two-dimensional bar codes unless the person knows also the scale-down ratio of the scaled-down split piece, it is possible to prevent illegal reading of the information codes.

In accordance with another aspect of the present invention, the information code product (e.g., an ID card 250) comprises a code-including image (251) formed on a body (e.g., card substrate 256), which includes a plurality of units (e.g., units 252–255 of two-dimensional bar codes) of information codes with one or more specific color, including predetermined coded information, wherein each of the plurality of units of information codes is arranged in a region at a desired position in the code-including image on the body and are adapted to obtain a desired unit of information codes by extracting a code image with the specific color from a corresponding region in the code-including image.

According to the information code product having such a structure, because a plurality of units of information codes are arranged at desired positions in an image, even if a person could specify the region and position for the unit of the necessary information codes, it is possible to make the construction for the person not to be able to read other units of information codes. Accordingly, it is possible to improve security for the information codes.

The plurality of units of information codes may have specific colors different to one another. According to such a structure, it is possible to increase the amount of information codes and to further improve security for the information codes.

Such a structure to increase the amount of information codes enables provision of a multipurpose card including a large number of information, e.g., insurance number, ID number, passwords and the like. Because each unit of the information codes can be arranged at desired positions on the original image, it is possible to increase flexibility for design of the ID card.

In accordance with another aspect of the present invention, the method for manufacturing an information code product, comprising the steps of:

synthesizing data of at least one unit of information codes (e.g., two-dimensional bar codes 103) with one or more specific color, and data of an original image (e.g., scenic image 102), to make a synthesized image data (104) and forming the synthesized image data on a body (e.g., paper 105 for print).

According to the method for manufacturing an information code product, any person cannot obtain the information codes in the synthesized image data unless the person knows the specific color. Accordingly, it is possible to improve security for the information codes.

In accordance with another aspect of the present invention, the method for manufacturing an information code product, comprising the steps of:

preparing data of at least one unit of information codes with one or more specific color, and data of an original image, synthesizing the data of at least one unit of information codes and data of an original image, to make a synthesized image data, by replacing color data of a portion having the specific color in the data of the original image, with another color data, and by replacing color data of portions in the data of the original image superimposed on the information codes, with the one of the specific color, and forming the synthesized image data on a body.

According to the method, because data of a portion having the specific color in the data of the original image are replaced with another color data, and data of portions in the data of the original image superimposed on the information codes are replaced with the one of the specific color, it is possible to prevent an error caused by capturing an image having no connection with the information codes.

Preferably, the unit of information codes is the one of two-dimensional bar codes with the one or more specific color.

In accordance with another aspect of the present invention, the method for manufacturing an information code product, comprising the steps of:

creating at least one unit of two-dimensional bar codes with one or more specific color, on the basis of data of a desired image, storing data of the created at least one unit of two-dimensional bar codes, and forming the desired image on a body.

According to the method, because a unit of two-dimensional bar codes with one or more specific color is created from the data of a desired image directly, an individual unit of two-dimensional bar codes with different specific color can be included into data of individual images. Therefore, it is possible to further improve security for the information codes.

That is, because the two-dimensional bar codes included in each individual image have colors peculiar to the image, it is possible to increase information security than use of two-dimensional bar codes having a common color.

The manufacturing method further may comprise the steps of:

splitting the unit of information codes (e.g., two-dimensional bar codes 207) into plural pieces (e.g., split two-dimensional bar code pieces 207a–207d), designating a position and a region on the original image (e.g., face picture 205 and space image 206), for each piece of the split unit of information codes to be synthesized, and synthesizing each piece of the split unit of information codes with the original image at the designated position and in the designated region, to make data of a synthesized image.

In the manufacturing method, after a unit of information codes with one or more specific color is split into plural pieces, a position and a region on the original image, for each piece of the split unit of information codes are designated and synthesized, to form the synthesized image on a surface of a body. Therefore, because no person can obtain the complete unit of information codes before splitting unless the person knows the specific color of the information codes, the positions and regions of the split pieces of the information codes on the synthesized image data, and the arrangement relationship between the split pieces, it is possible to improve the security for the information codes and to increase flexibility for design of the product because the split of information codes can be arranged at desired positions on the original image.

In accordance with another aspect of the present invention, the manufacturing method for manufacturing an information code product, comprises the steps of:

designating positions and regions, of a plurality of units of information codes (e.g., units 252–255 of two-dimensional bar codes) with one or more specific color, including predetermined coded information, to synthesize to the original image, synthesizing the plurality of units of information codes with the original image at the designated positions and in the regions, to make data of a synthesized image, and forming the synthesized image on a body (e.g., card substrate 256).

In the manufacturing method, because the positions and regions on the original image, of the plurality of units of information codes with one or more specific color are designated and synthesized to make a synthesized image data, and a synthesized image is formed on a body, even if a person could specify the position and region on the original image, of one unit of information codes, it is possible to make the construction for the person not to read other units of information codes. Therefore, it is possible to improve security for the information codes.

In accordance with another aspect of the present invention, the manufacturing apparatus for manufacturing an information code product, comprises:

a synthesizing section (114) for synthesizing data of at least one unit of information codes (e.g., two-dimensional bar codes 103) with one or more specific color, and data of an original image (e.g., scenic image 102), to make a synthesized image data and a forming section (116) for forming the synthesized image data on a body (e.g., paper 105 for print).

According to manufacturing apparatus for manufacturing an information code product, any person cannot obtain the information codes in the synthesized image data unless the person knows the specific color. Accordingly, it is possible to improve security for the information codes.

Preferably, the synthesizing section (114) makes the synthesized image data (104), by replacing color data of a portion having the specific color in the data of the original image (102), with another color data, and by replacing color data of portions in the data of the original image superimposed on the information codes (103), with the one of the specific color.

According to the manufacturing apparatus, because data of a portion having the specific color in the data of the original image are replaced with another color data, and data of portions in the data of the original image superimposed on the information codes are replaced with the one of the specific color, it is possible to prevent an error caused by capturing an image having no connection with the information codes.

Preferably, the unit of information codes is the one of two-dimensional bar codes with the one or more specific color.

In accordance with another aspect of the present invention, the manufacturing apparatus for manufacturing an information code product (e.g., an IC card manufacturing apparatus 210), comprises:

an original image data capture section (212) for capturing data of a desired original image, a specific color designating member (214) for designating one or more specific color to each of a plurality of units of information codes including predetermined coded information, a synthesizing position designating member (216) for designating positions and regions, of the original image, to combine the plurality of units of information codes, a synthesizing member (217) for synthesizing the plurality of units of information codes with the original image at the designated positions and in the regions, to make data of a synthesized image, and a formation member (219) for forming the synthesized image on a body.

According to the manufacturing apparatus, it is possible to provide an information code product which has an excellent security for the information codes and increases the amount of information codes and flexibility for design of the product.

Preferably, the manufacturing apparatus further comprises an information code splitting member (215) for splitting at least one unit of information codes into plural pieces, and the specific color designating member designates one or more specific color to each of plural pieces of the split unit of information codes, and the synthesizing position designating member designates a position and a region, of the original image, to compose each of plural pieces of the split unit of information codes.

According to the manufacturing apparatus having such a structure, because the entirety of unit of information codes is not obtained until split pieces of information codes are appropriately combined, no person can obtain the complete unit of information codes unless the person knows the synthesizing positions and regions, and the arrangement relationship between the split pieces. Accordingly, it is possible to provide an information code product which has a further excellent security for the information codes.

In accordance with another aspect of the present invention, the information code reading apparatus (130) for reading information codes from an information code product (e.g., bar code sticker 101) with a code-including image which includes a unit of information codes with a specific color, in a desired region at a desired position, comprises:

an illumination member (131, 132) for illuminating a light with substantially the same color as the specific color of the information codes, to the code-including image, an information code extracting member (136) for extracting the information codes with the specific color, on the basis of data of light reflected by the code-including image, and a decoding member (137) for decoding the information codes extracted by the information code extracting member.

In the information code reading apparatus, because after the light with substantially the same color as the specific color of the hidden information codes, is illuminated to the code-including image, the information codes with the specific color are extracted on the basis of data of light reflected by the code-including image, the hidden information codes in the image can be decoded.

In accordance with another aspect of the present invention, the information code reading apparatus (140) for reading information codes from an information code product with a code-including image which includes a unit of information codes with a specific color, in a desired region at a desired position, comprises:

an image capturing member (141) for capturing data of the code-including image on the product (e.g., bar code sticker 101), an information code extracting member (142) for extracting the information codes by extracting an image with the specific color from the data of the code-including image captured by the image capturing member, and a decoding member (143) for decoding the information codes extracted by the information code extracting member.

In the information code reading apparatus, because the information codes are obtained by extracting an image with the specific color from the data of the captured code-including image, thus the hidden information codes in the image can be decoded.

In accordance with another aspect of the present invention, the information code reading apparatus (e.g., bar code reading device 230) for reading information codes from an information code product with a code-including image which includes a unit of information codes with a specific color, in a desired region at a desired position, comprising:

a position designating member (e.g., storage section 231 and reading position designating section 232) for designating the desired position and the desired region in the image, including the unit of information codes, an illumination member (e.g., light source section 233 and light control section 234) for illuminating a light with substantially the same color as the specific color of the information codes, to the code-including image, an information code extracting member (e.g., bar code obtaining section 238) for extracting the information codes with the specific color, on the basis of data of light reflected by the code-including image in the desired region, and a reading member (e.g., decoder 239) for reading the information codes extracted by the information code extracting member.

In the information code reading apparatus, because after a light with substantially the same color as the specific color of the information codes, is illuminated to the code-including image, the information codes with the specific color are extracted on the basis of data of light reflected by the code-including image in the desired region, it is possible to read the information code with the specific color in a desired region at a desired position.

The light with the specific color from the illumination member may be illuminated over the entire surface of the code-including image and may be also illuminated only onto the region at the position in the image, designated by the position designating member.

In accordance with another aspect of the present invention, the information code reading apparatus (e.g., a bar code reading device 240) for reading information codes from an information code product with a code-including image which includes a unit of information codes with a specific color, in a desired region at a desired position, comprising:

an image capturing member (e.g., an image scanner 241) for capturing data of the code-including image on the product, a position designating member (e.g., a storage section 242, and a reading position designating section 243) for designating the position and the region in the code-including image, including the unit of information codes, a color selection member (e.g., a specific color selection section 244) for selecting the specific color of the information codes, an information code extracting member (e.g., an image analysis section 245) for extracting the information codes by extracting an image with the specific color from the data of the code-including image captured by the image capturing member, on the basis of the position and the region designated by the position designating member, and a reading member (246) for reading the information codes extracted by the information code extracting member.

In the information code reading apparatus, because the information codes are extracted by extracting an image with the specific color from the captured data of the code-including image, on the basis of the designated information of position and region, it is possible to read the information code with the specific color in an image.

The information code extracting member may obtain desired information codes by combining a plurality of pieces of information codes to obtain a desired unit of information codes.

According to the information code reading apparatus, because desired information codes are obtained by combining a plurality of pieces of information codes to obtain a desired unit of information codes, it is possible to read even a desired unit of information codes being split into plural pieces.

In accordance with one aspect of the present invention, the authentication system (301) for authenticating a user of an information code product (e.g., a credit card 305), comprising a network (304) interconnecting an authentication terminal (302) for reading data which are included in the card and an authentication server (303), wherein the information code product comprises a body having a code-including image formed thereon which includes a first unit of identifying information codes (e.g., two-dimensional bar codes 307 and 308), with at least a first specific color including coded identifying information for identifying the owner and a second unit of owner's information codes with at least a second specific color, including coded information for the owner other than the coded identifying information, the authentication terminal is adapted to capture data of the code-including image of the information code product, to obtain the coded identifying information by extracting an image with the at least a first specific color from the code-including image, and to obtain the identifying information by decoding, and to send the data of the code-including image captured from the information code product to the authentication server when the obtained identifying information matches an input information input by the user, and the authentication server generates an authentication result for the user on the basis of the data of the code-including image sent from the authentication terminal, and send an authentication result signal according to the authentication result to the authentication terminal.

In the authentication system according to the invention, because the authentication terminal is adapted to capture data of the code-including image of the information code product, to obtain the coded identifying information by extracting an image with the at least a first specific color from the code-including image, and to obtain the identifying information by decoding, and to send the data of the code-including image captured from the information code product to the authentication server when the obtained identifying information matches an input information input by a user, the authentication terminal can judge whether the input information by the user is correct, to authenticating the user.

As the identifying information, although passwords are typically used, the owner's signature can be also used. The owner's signature may be also included in the owner's information. According to such a structure, because the owner's signature is not exposed on the product, it makes difficult to imitate the signature of the owner by a third person and therefore it is possible to prevent an illegal use of the information code product such as a card.

The network includes not only the one of using public telephone line but a private line network including an office network, internet or the like.

The information code product includes every product including an image of information codes thereon, for identifying the owner thereof. The product may have various types of shape, e.g., card shape, rectangular parallelopiped shape, ball shape and the like. The one of the card shape includes a credit card, a cash card for bank, a card for using in an intelligent building, and the like.

Preferably, the data sent to the authentication server from the authentication terminal are the one of the code-including image of the information code product and the identifying information, and the authentication server obtains the coded information for the owner by extracting an image with the at least a second specific color, from the sent code-including image, and obtains the information for the owner by decoding, to generate the authentication result for the user.

According to the authentication system having such a structure, because the information of the owner is sent in the form of coded image data and is analyzed by the authentication server, it is possible to prevent a leakage of information by interruption into the line or by conversion of the reading device. Therefore, it is possible to provide an authentication which improve security for the information codes.

In accordance with another aspect of the present invention, the authentication terminal (302) which is interconnected with an authentication server (303) through a network (304), for authenticating a user of an information code product by reading data included in the information code product (e.g., credit card 305), comprises:

an image capture section (322) for capturing data of a code-including image (306) in the information code product, the code-including image including a first unit of identifying information codes (307) with at least a first specific color, which includes coded identifying information for identifying the owner and a second unit of owner's information codes (308) with at least a second specific color, which includes coded information for the owner other than the coded identifying information, an image analysis section (323) for obtaining the coded identifying information by extracting an image with at least the first specific color from the code-including image, to obtain the identifying information by decoding, a transmitting section (325) for sending the data of the code-including image captured by the image capture section to the authentication server when the obtained identifying information matches an input information input by the user, and a receiving section (326) for receiving an authentication result for the user, which is generated by an authentication server on the basis of the sent data of the code-including image.

According to the authentication terminal having such a structure, because the image analysis section (323) obtains the coded identifying information by extracting a coded image with the first specific color from the code-including image, it is possible to obtain the identifying information of the owner of the information code product by decoding the extracted coded image.

Because the data of the code-including image are sent to the authentication server when the obtained identifying information matches an input information input by the user, and the receiving section receives an authentication result for the user, which is generated by an authentication server on the basis of the sent data of the code-including image, it is possible to prevent a leakage of information by interruption into the line.

Preferably, when the received authentication result includes an approval signal for giving an approval of reading the owner's information, the image analysis section extracts an image with at least the second specific color from the code-including image on the basis of the arrangement information of the owner's information codes, which is designated by the identifying information, to obtain the owner's information by decoding.

According to the authentication terminal having such a structure, because no owner's information can be obtained so long as no approval signal is obtained, it is possible to prevent a leakage of information by misusing the authentication terminal. Therefore, it is possible to provide an authentication which improve security for the information codes.

The arrangement information of the owner's information codes, may be determined at will, for example, on the basis of a random number corresponding to the identifying information, on the basis of a value found by applying the identifying information and the date of birth of the owner into a formula, or the like.

The authentication terminal may further comprises an input device for inputting user's signature (e.g., tablet 327), and a judging device (e.g., CPU 320) for judging if the input user's signature is correct.

According to the authentication terminal having such a structure, because the user inputs a signature into the input device directly without filling in a paper or the like, no traces of the signature remain on the paper or the like, therefore, it is difficult for a third person to imitate the signature. As a result, it is possible to prevent an illegal use of a card or the like, and to provide an authentication system which improve security for the information codes.

Because a judging device for judging if the input user's signature is correct, is provided, it is possible to perform automatic authentication of a user.

The terminal may have an individual number itself and the transmitting section sends the individual number together with the data of the code-including image captured by the image capture section, to the authentication server.

Accordingly, it is possible to prevent misuse of the authentication terminal. Therefore, it is possible to provide an authentication terminal which improve security for the information codes.

The authentication terminal may further comprise a volatile storage section (e.g., ROM 321a) for storing the arrangement information of the owner's information codes which is designated by the identifying information.

Because if the supply of current is stopped, the arrangement information of the owner's information codes stored in the storage section also disappear, it is impossible to read the data of the card or the like when the storage section is removed from the terminal. Therefore, it is possible to prevent a leakage of information by misusing the authentication terminal.

In accordance with another aspect of the present invention, the authentication server (303) which is interconnected with an authentication terminal (302) through a network (304), for authenticating a user of an information code product by reading data included in the information code product, comprises:

a receiving section (331) for receiving the data of the code-including image including owner's information codes (308) with at least a second specific color and coded identifying information for identifying an owner of the product, which are sent from the authentication terminal, an image analysis section (333) for extracting a coded image with at least the second specific color from the code-including image on the basis of the coded identifying information, to obtain the owner's information by decoding, an authentication result creating section (330) for creating an authentication result for the user on the basis of the obtained the owner's information, and a transmitting section (335) for sending the authentication result to the authentication terminal.

In the authentication server having such a structure, the authentication server extracts a coded image with at least the second specific color from the code-including image on the basis of the coded identifying information, and obtains the owner's information by decoding extracted coded image. Accordingly, the authentication server can decode the codes with the second specific color hidden in a code-including image, and thereby can authenticate the user on the basis of the obtained the owner's information.

In accordance with another aspect of the present invention, the authentication method for authenticating a user of an information code product which comprises a code-including image formed thereon which includes a first unit of identifying information codes with at least a first specific color, including coded identifying information for identifying an owner of the product and a second unit of owner's information codes with at least a second specific color, including coded information for the owner other than the coded identifying information, by using an authentication terminal for reading data which are included in the product and an authentication server which is interconnected to the authentication terminal through a network, the method comprises the steps of:

capturing data of the code-including image of the information code product (S102), extracting an image with at least the first specific color from the code-including image, to obtain the identifying information by decoding (S103), sending the data of the code-including image captured from the information code product to the authentication server when the obtained identifying information matches an input information input by the user (S107), and receiving an authentication result generated by the authentication server, on the basis of the data of the code-including image (S110).

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIG. 18 is a flow chart for explaining the function of the authentication server of the invention.

PREFERRED EMBODIMENT OF THE INVENTION

The information code printed article (information code product), a method for manufacturing the information code printed article, a method for manufacturing bar code printed article, and a bar code reading device, according to an embodiment of the present invention will be explained.

Figure 1:
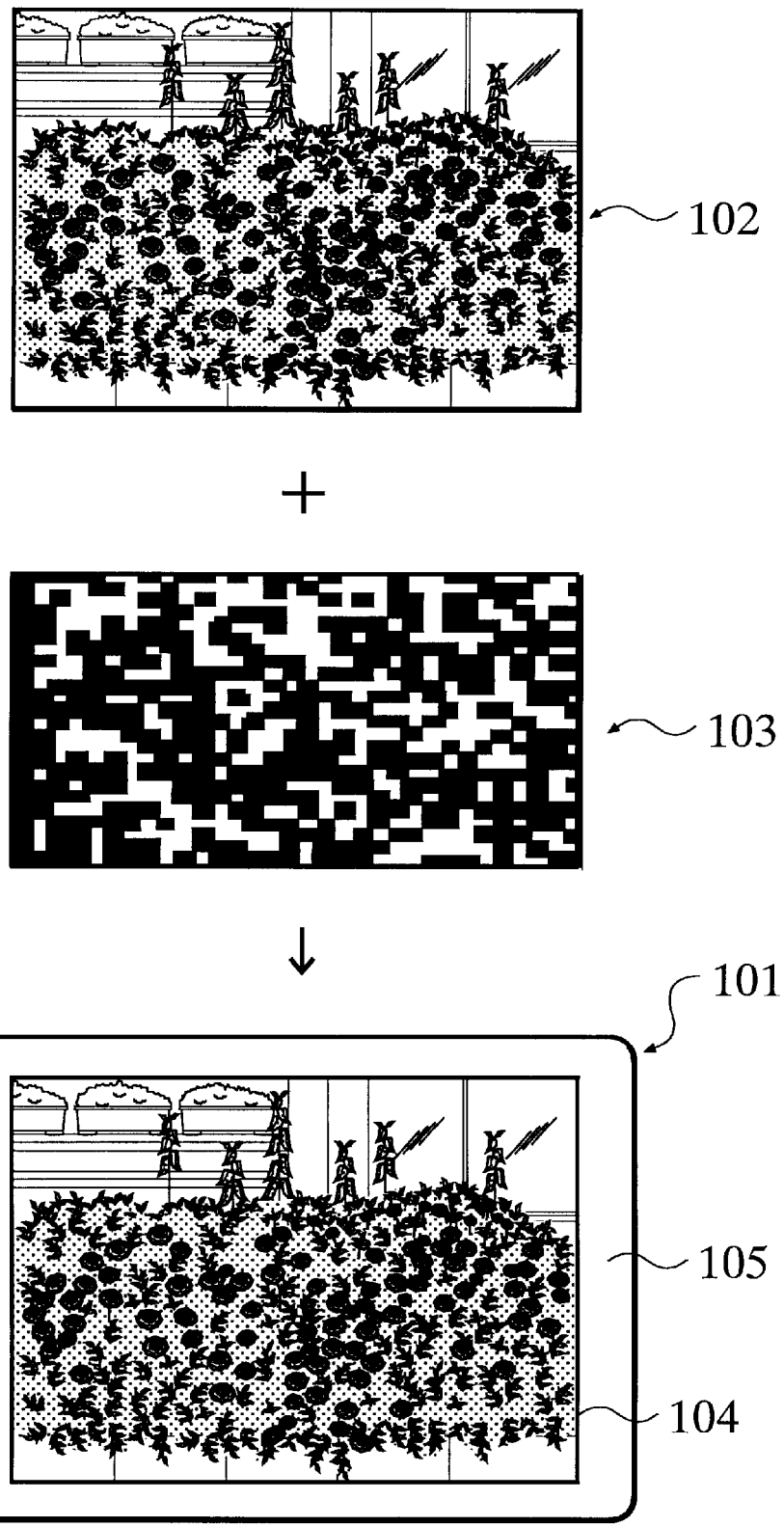
FIG. 1 is a view showing a bar code sticker according to an embodiment of the invention.

FIG. 1 shows a bar code sticker according to an embodiment of an information code product of the invention.

In FIG. 1, the bar code sticker 101 which is an information code printed article comprises a paper 105 for printing, on which a synthesized image 104 is printed. The synthesized image 104 is formed by synthesizing data of a scenic image 102 as an original color image with at least one prepared data unit 103 of two-dimensional bar codes (information codes) having one or more specific color.

The color of the data unit 103 of two-dimensional bar codes is determined in advance by specifying the ratio of three colors to be mixed, i.e., cyan, magenta and yellow.

Figure 2:
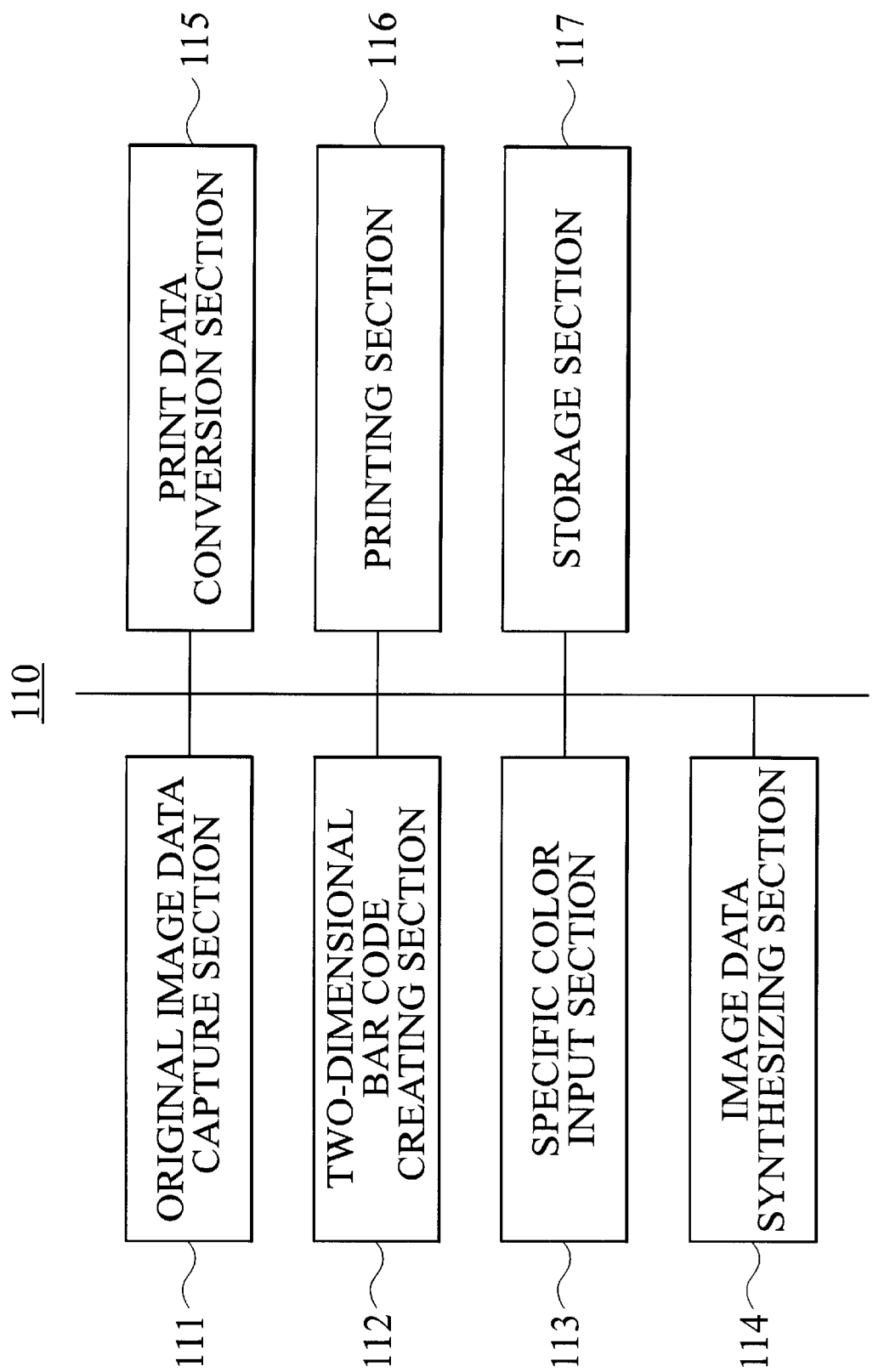
FIG. 2 is a block diagram showing a structure of the principal portion of a bar code sticker manufacturing apparatus.

Next, the method for manufacturing the bar code sticker 101 will be explained with reference to FIG. 2.

In order to manufacture the bar code sticker 101, for example, a bar code sticker manufacturing device 110 is used. The bar code sticker manufacturing device 110 comprises an original image data capture unit 111, a two-dimensional bar code creating unit 112, a specific color input unit 113, an image data synthesizing unit 114, a print data conversion unit 115, a printing unit 116, and a storage unit 117, as shown in FIG. 2.

The original image data capture unit 111 is controlled by a CPU (not shown) and performs capture processing of the data of a scenic image picked up by a CCD camera or the like (not shown).

The two-dimensional bar code creating unit 112 is controlled by a CPU (not shown) and performs two-dimensional bar code processing of desired information according to a predetermined manner.

The specific color input unit 113 is a device for inputting the information data of the specific color for the two-dimensional bar code, for example, the data of color comprising 70% cyan, 40% magenta and 10% yellow.

The data of the original image captured from the original image data capture unit 111, the two-dimensional bar codes created by the two-dimensional bar code creating unit 112, and the data of the specific color for the two-dimensional bar code input into the specific color input unit 113 are sent to the image data synthesizing unit 114, to be synthesized.

First, the image data synthesizing unit 114 extracts the portion with the specific color which was input at the specific color input unit 113, in the original image data, and changes the color data of the portion with the specific color to a color other than the specific color. Thereafter, the data of the two-dimensional bar codes are superimposed on the data of the changed color original image, and replaces the color data of every portion which superimposes on the two-dimensional bar codes, to that of the specific color, to make a synthesized image.

The image data synthesizing unit 114 can also synthesize a plurality of different units of two-dimensional bar codes with an original image data by superimposing the data of a plurality of desired different units of two-dimensional bar codes on a plurality of different regions on the data of the color original image and by repeatedly performing the processes similar to the above-described one.

The print data conversion unit 115 is controlled by a CPU (not shown) and performs conversion of the image data synthesized at the image data synthesizing unit 114 to printing data.

The printing unit 116 prints a synthesized image with determined colors on the printing paper 105 according to the printing data.

The storage unit 117 stores the data of the two-dimensional bar code created by the two-dimensional bar code creating unit 112, the information data of the specific color input from the specific color input unit 13, the color image data composed by the image data synthesizing unit 114 and the like.

The stored data of the two-dimensional bar code and the information data of the specific color can be taken out of the storage unit 117, to compose them with data of another different original image.

As described above, the bar code sticker 101 is manufactured by preparing the composed color image data of an original color image data and data of two-dimensional bar codes having a specific color through the image data synthesizing unit 114, and thereafter by printing the prepared synthesized color image data on the printing paper 105.

In the information code printed article according to the present invention, because the two-dimensional bar codes having a specific color are composed in an original color image and the specific color of the two-dimensional bar code codes can be selected appropriately to be natural to the original color image, it is difficult to find the two-dimensional bar codes in the synthesized color image so long as a person does not know what the specific color of the two-dimensional bar codes is. Therefore, it is possible to improve the secrecy of the two-dimensional bar codes.

Because when the synthesized color image data of an original color image data and data of two-dimensional bar codes having a specific color are prepared, color data of every pixel having the specific color in the data of the color original image are replaced with another color data, and color data of pixels in the data of the color image superimposed on the two-dimensional codes are replaced with the data of the specific color, it is possible to prevent error based on existence of the specific color in the region other than the region of the two-dimensional codes.

The two-dimensional bar code creating unit 112 is not essential for the invention. It is possible to use a unit of two-dimensional bar codes which has been prepared in advance instead of preparation of the two-dimensional bar code creating unit 112.

Figure 3:
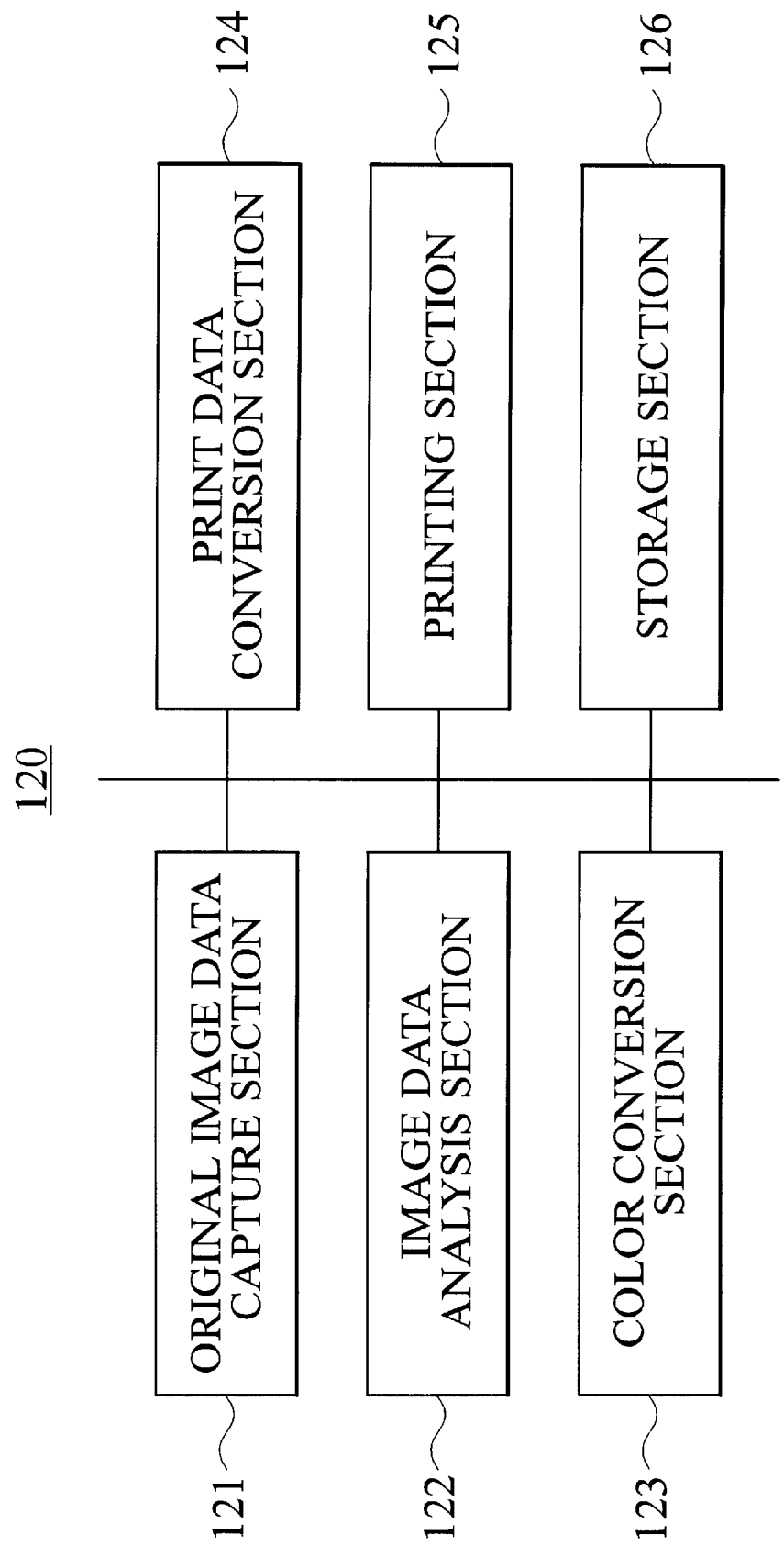
FIG. 3 is a block diagram showing a structure of the principal portion of another bar code sticker manufacturing apparatus.

The bar code sticker 101 can be manufactured by a bar code sticker manufacturing device 120, as shown in FIG. 3.

The bar code sticker manufacturing device 120 comprises an original image data capture unit 121, an image data analysis unit 122, a color conversion unit 123, a print data conversion unit 24, a printing unit 125, and a storage unit 126, as shown in FIG. 3.

The original image data capture unit 121 is controlled by a CPU (not shown) and performs capture processing of the data of a scenic color image picked up by a CCD camera or the like (not shown).

The image data analysis unit 122 is controlled by the CPU (not shown) and determines the specific color for the unit of the two-dimensional bar codes which is stored in the storage unit 126 on the basis of the color data in the image data.

In particular, the specific color for the unit of the two-dimensional bar codes may be a color which reduces the color conversion to a minimum from the color pattern of the image data, for example, the data of color comprising 70% cyan, 40% magenta and 10% yellow.

The color conversion unit 123 is controlled by the CPU (not shown). The color conversion unit 123 converts the color data of the pixels of the image data which are superimposed with the two-dimensional bar codes and have different colors from the specific one determined by the image data analysis unit 122, to the data of the specific color, and also converts the color data of the pixels of the image data which are not superimposed with the two-dimensional bar codes and have the specific color, to the data of color other than the specific color.

The image data analysis unit 122 and the color conversion unit 123 can also synthesize a plurality of different units of two-dimensional bar codes with an original image data by superimposing the data of a plurality of desired different units of two-dimensional bar codes on a plurality of different regions on the data of the color original image and by repeatedly performing the processes similar to the above-described one.

The print data conversion unit 124 is controlled by the CPU (not shown). The print data conversion unit 124 concerts the image data synthesized by the color conversion unit 123 to printing data.

The printing unit 125 prints a synthesized image with colors which are determined every pixels, on the printing paper 105 according to the printing data.

The storage unit 126 stores the data of the two-dimensional bar code, the information data of the specific color determined by the image data analysis unit 122, the color image data composed by the color conversion unit 123.

As described above, the bar code sticker 101 is manufactured by determining the specific color of the two-dimensional bar codes, which reduces the color conversion to a minimum from the color pattern of the image data, by the image data analysis unit 122, and thereafter by printing the converted color image data on the printing paper 105.

In the information code printed article according to the present invention, because the two-dimensional bar codes having a specific color can be prepared on the basis of a desired color image data directly, the specific color of the two-dimensional bar codes for each image is different from one another. Therefore, it is possible to improve the secrecy of the two-dimensional bar codes.

Because each synthesized color image data has a peculiar specific color of the two-dimensional bar codes, it is possible to improve the secrecy of the two-dimensional bar codes more than use of a common specific color.

Figure 4:
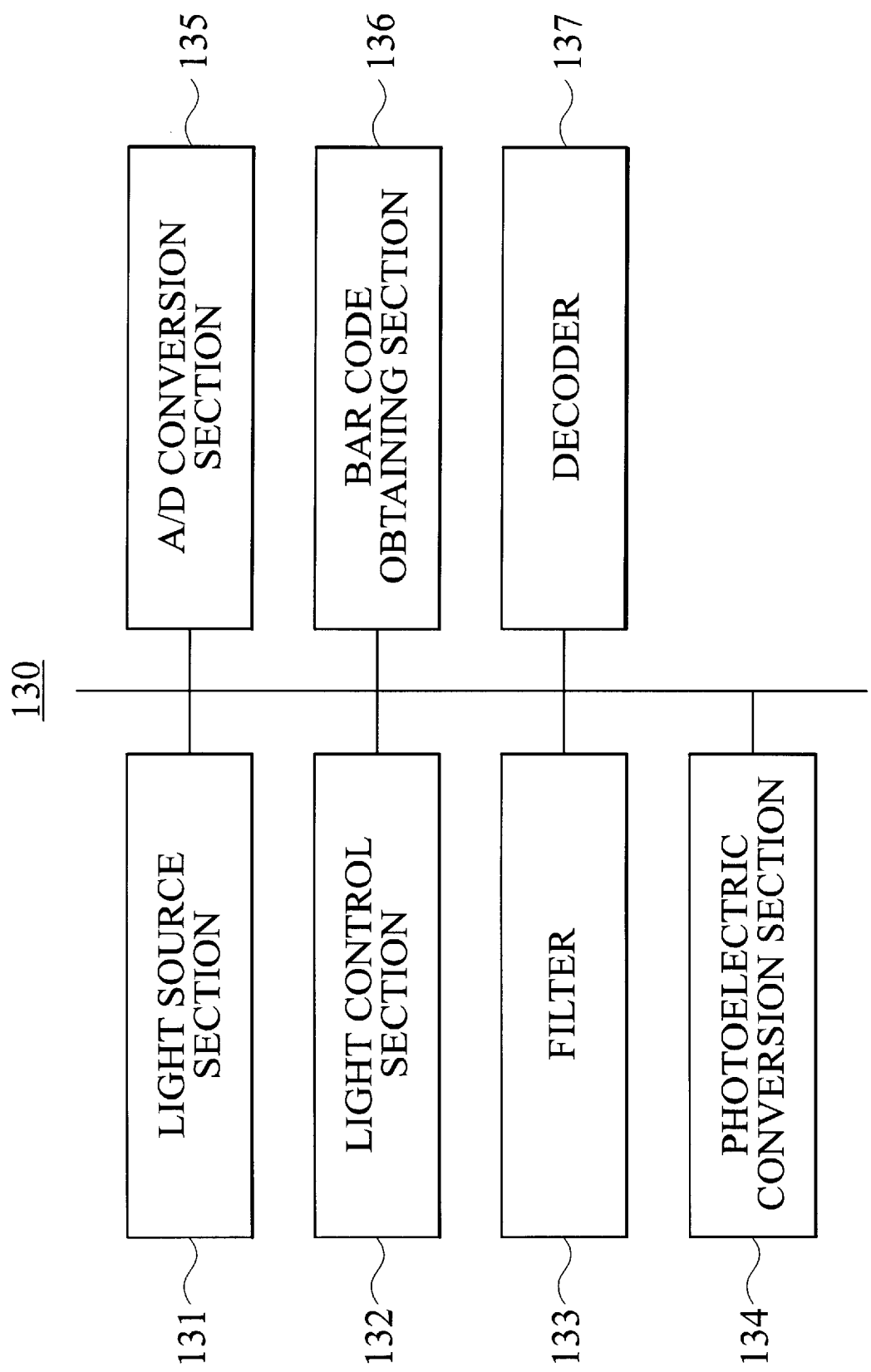
FIG. 4 is a block diagram showing a structure of the principal portion of a bar code reading device.

Next, an embodiment of the bar code reading device 130 for reading the two-dimensional color bar codes in the synthesized image portion 104 will be explained with reference to FIG. 4.

The bar code reading device 130 comprises a light source unit 131, a light control unit 132, a filter 33, a photoelectric conversion unit 134, an A/D conversion unit 135, a bar code obtaining unit 136 and a decoder 137.

The light source unit 131 in the bar code reading device 130 emits a light with a frequency corresponding to the specific color of the two-dimensional color bar codes which is controlled by the light control unit 132, to provide an illumination thereof to the synthesized image portion 104 of the bar code sticker 101.

The light control unit 132 is controlled by the CPU (not shown), and controls the light source unit 131 to provide an illumination light with a frequency corresponding to the specific color so that the reading device can receive a reflected light of only the specific color.

The filter 133 separates the reflected light from the synthesized image portion 104 into frequency components.

The photoelectric conversion unit 134 converts the light of each frequency component separated by the filter 133 to an electric signal.

The A/D conversion unit 135 converts the analog electric signal converted by the photoelectric conversion unit 134 to digital signal.

The bar code obtaining unit 136 is controlled by a CPU (not shown) and obtains the two-dimensional bar codes with a specific color by reversing the digital electric signal from the A/D conversion unit 135.

The decoder 137 decodes to read a predetermined information in the two-dimensional bar codes obtained by the bar code obtaining unit 136.

When the entirety of the two-dimensional bar codes cannot be read by a single specific color, it can be read by repeatedly performing the above-described reading operations.

As described above, in the embodiment, an illumination of the light with a frequency corresponding to the specific color of the two-dimensional color bar codes is given to the synthesized image portion 104 in which the specific color of the two-dimensional color bar codes is hidden, of the bar code sticker 101. Thereafter, the data of the two-dimensional color bar codes with the specific color are extracted on the basis of the reflected light from the synthesized image portion and decoded to read.

The bar code reading device 130 according to the embodiment can be manufactured by adding only the light control unit 132 to an existing bar code reader. Therefore, it is possible to manufacture the bar code reading device at a low cost.

Figure 5:
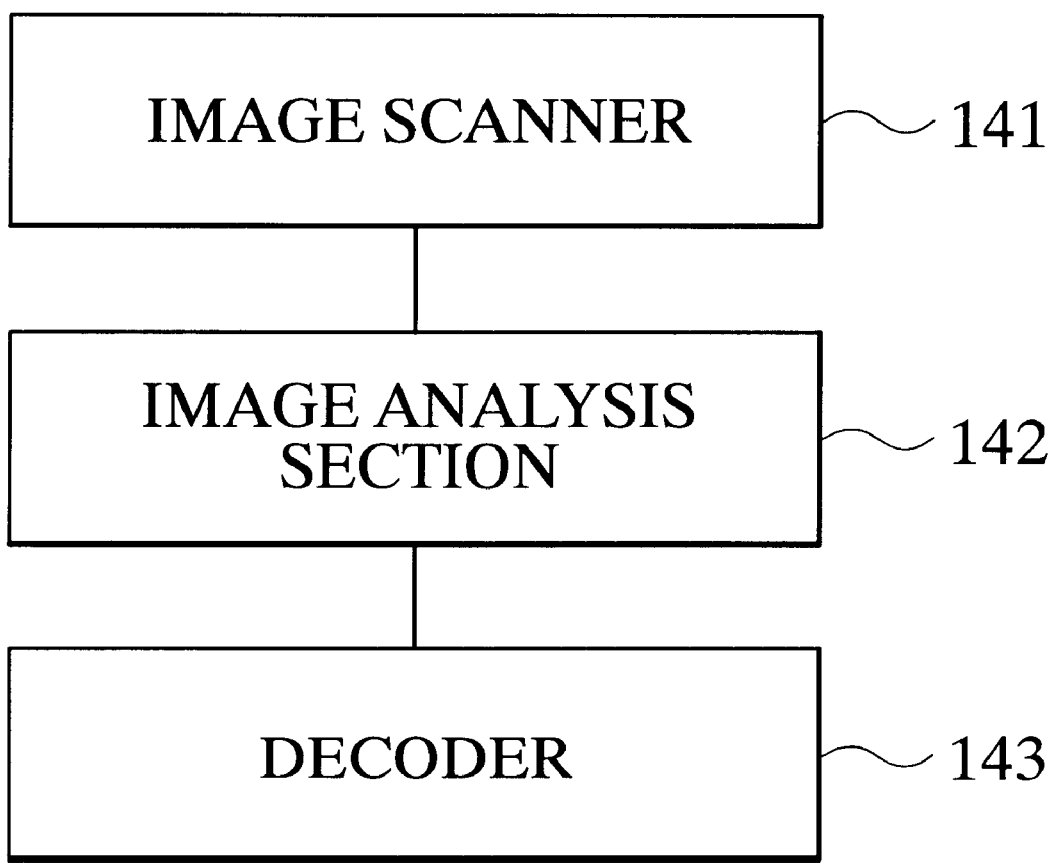
FIG. 5 is a block diagram showing a structure of the principal portion of another bar code reading device.

As a bar code reading device, an image scanner can be adopted, as shown in FIG. 5.

The bar code reading device 140 comprises an image scanner 141, an image analysis unit 142 and a decoder 143.

The image scanner 141 comprises a CCD sensor (not shown) and converts an image information of color image data to digital signals every pixel, to output to the image analysis unit 142.

The image analysis unit 142 extracts an image of the specific color from the color image data captured by the image scanner 141 to obtain the data of a unit of the two-dimensional color bar codes.

In this case, the entirety of the two-dimensional color bar codes may comprise a combination of a plurality of units with different colors.

The decoder 143 decodes to read a predetermined information in the two-dimensional bar codes obtained by the image analysis unit 142.

As described above, in the embodiment, the data of the two-dimensional color bar codes are extracted by obtaining the image of the specific color from the captured color image data and are decoded to read.

According to the embodiment of the invention, because the two-dimensional bar codes having a specific color are included in the color image data, it is difficult to find the two-dimensional bar codes in the synthesized color image so long as a person does not know what the specific color of the two-dimensional bar codes is. Therefore, it is possible to improve the secrecy of the two-dimensional bar codes.

That is, because the two-dimensional bar codes having a specific color are hidden in the color image data, existence of the two-dimensional bar codes cannot be recognized by only seeing the color image. Therefore, it is possible to improve the secrecy of the information of the two-dimensional bar codes in comparison with the information in conventional two-dimensional bar codes or in a magnetic card, in which the information codes are exposed to the outside.

Because two-dimensional bar codes are used as information codes, it is possible to increase the amount of information contained in the codes and to make the color image data including bar codes easily.

In the above-described embodiments, although only two-dimensional bar codes is disclosed as information codes, the invention is not limited to this, it is also possible to use 3D-hologram which is composed in the color image.

A plurality of units of different information codes with a specific color are also contained in a color image. Accordingly, it is possible to increase the amount of information contained in the codes and to improve the secrecy of the information of the two-dimensional bar codes.

It is possible to further improve the secrecy of the information of the two-dimensional bar codes by using a combination of a plurality of specific colors of the two-dimensional bar codes.

Other embodiments of the information code product of the invention, an apparatus and method for manufacturing the information code product, and an information code reading device, will be explained, with reference to FIGS. 6–16B.

Figure 6:
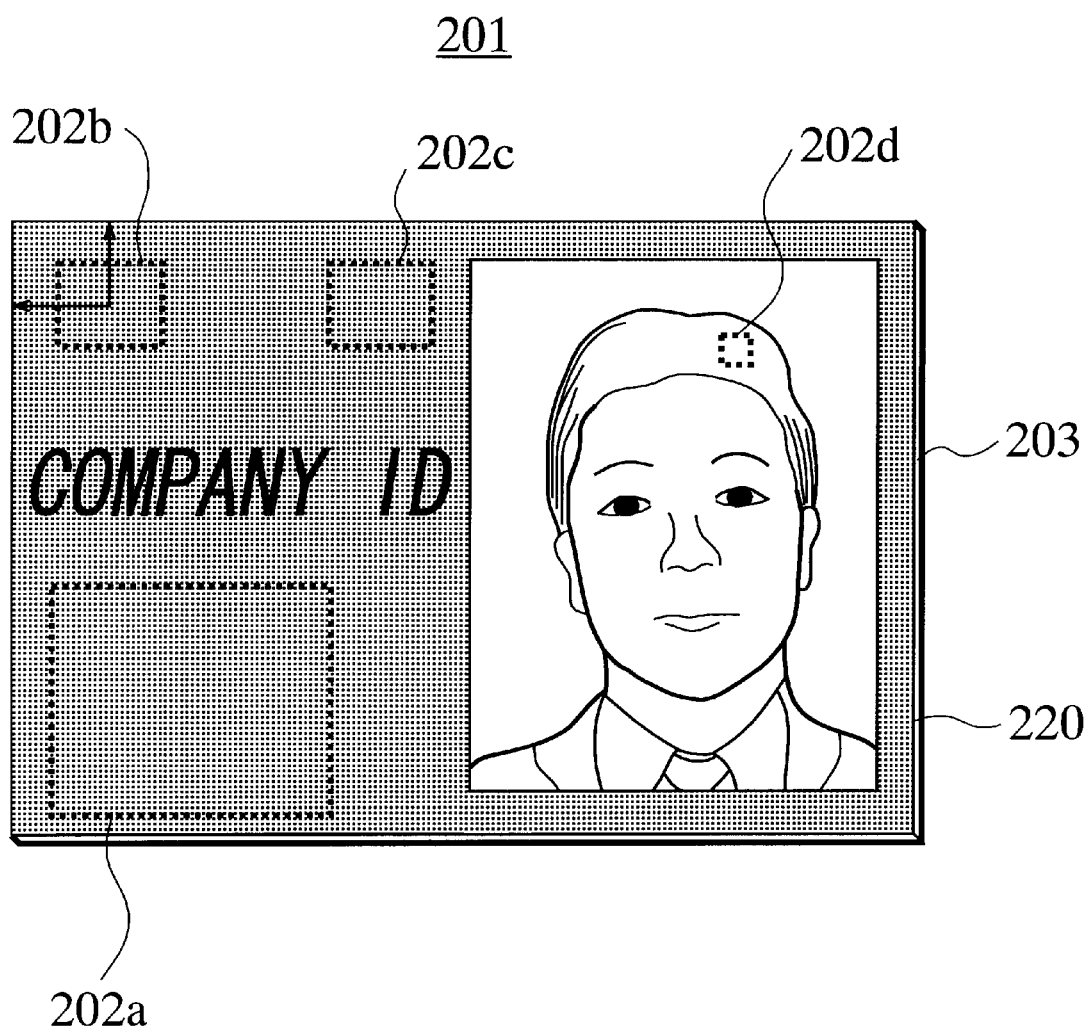
FIG. 6 is a view showing an ID card according to another embodiment of the invention.

FIG. 6 shows an identification card, i.e., ID card, according to another embodiment of the information code product of the present invention.

Figure 7:
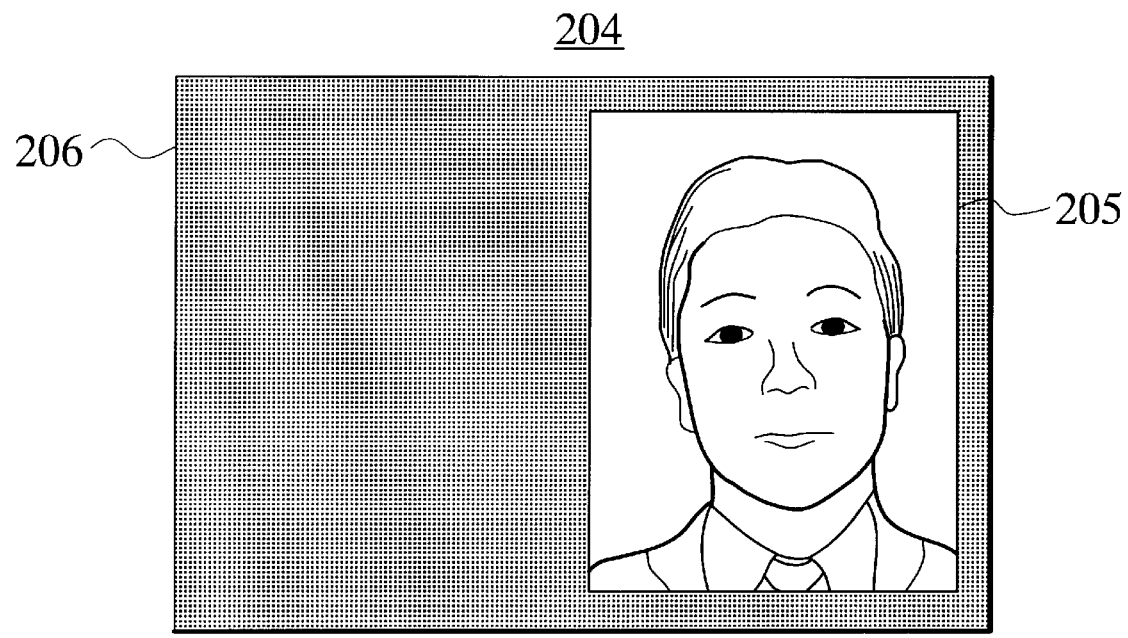
FIG. 7 is a view showing an original image for the ID card shown in FIG. 1.
Figure 8:
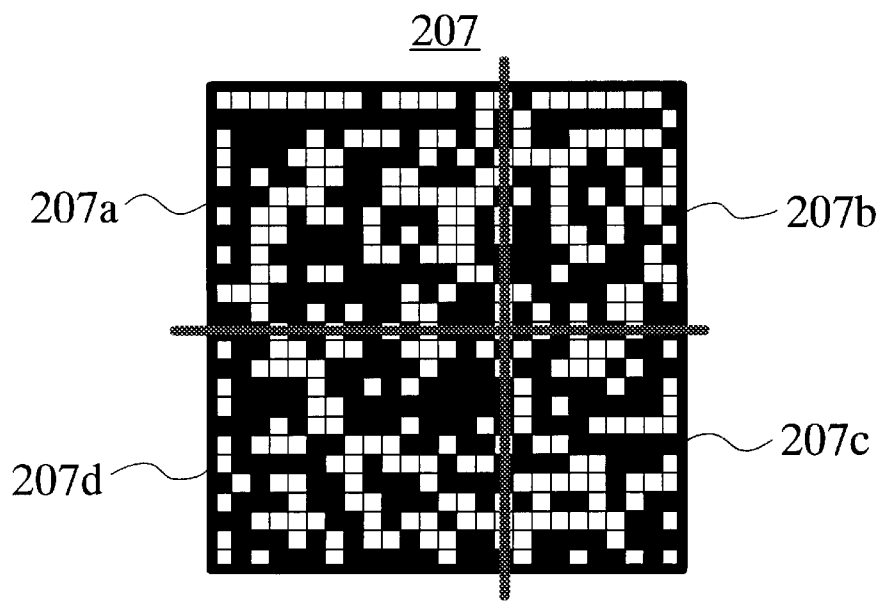
FIG. 8 is a view showing a unit of two-dimensional bar codes before being split, which is hidden in the image on the ID card.

In this figure, the ID card 201 such as a company ID which is an information code product comprises a card substrate 203 and a synthesis image portion 202 having a synthesis image including an owner's face picture, which is printed on the card substrate 203. The synthesis image printed on the card substrate 203 is obtained by synthesizing data of an original image 204 which includes an owner's face picture 205 and a background (space) image 206, which is shown in FIG. 7, with four split pieces 207a, 207b, 207c and 207d of two-dimensional bar codes, obtained by splitting a prepared unit 207 of two-dimensional bar codes into four, which is shown in FIG. 8. When synthesizing, each of the four split pieces 207a, 207b, 207c and 207d of two-dimensional bar codes is synthesized at a desired position on the original image 204.

The four split pieces 207a, 207b, 207c and 207d of two-dimensional bar codes are hidden in corresponding small regions 202a, 202b, 202c and 202d of the synthesis image portion 202 in a way that a person cannot recognize the existence of them visually unless the person uses the reading apparatus of the invention. One 207d of the split pieces 207a, 207b, 207c and 207d of two-dimensional bar codes is scaled down and is synthesized in the region 202d in the face picture 205 of the original image 204.

The entirety of unit 207 of two-dimensional bar codes is not obtained until the scaled-down split piece 207d is scaled up by the original size thereof and thereafter four split pieces 207a, 207b, 207c and 207d of two-dimensional bar codes are appropriately combined.

The two-dimensional bar codes 207 have a particular color containing a particular color ratio of cyan, magenta, yellow and black. The colors of four split pieces 207a, 207b, 207c and 207d of two-dimensional bar codes may be different from one another.

Figure 9:
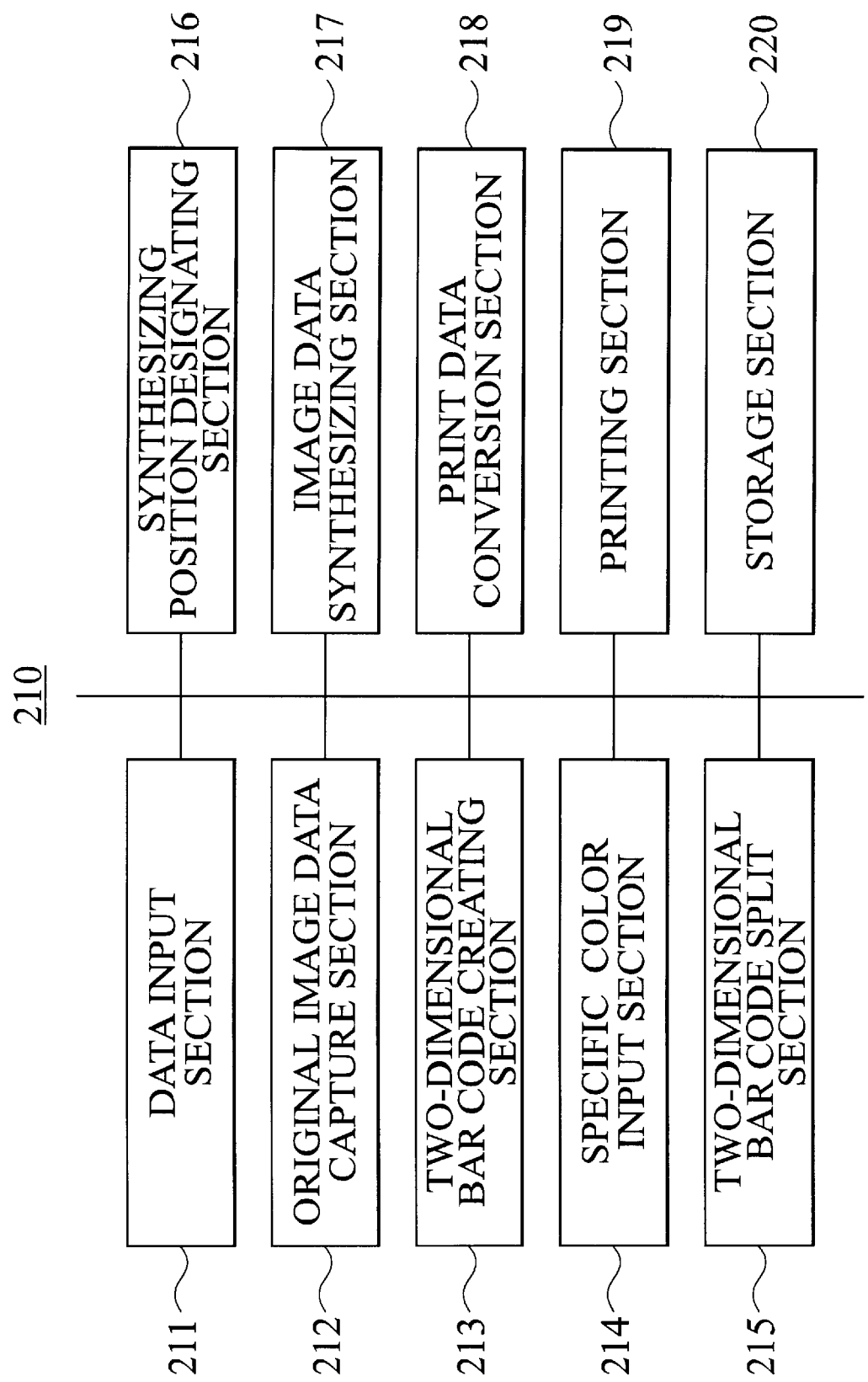
FIG. 9 is a block diagram showing a structure of the principal portion of an ID card manufacturing apparatus.

Next, the apparatus and method for manufacturing an ID card 201 will be explained with reference to FIG. 9.

In order to manufacture the ID card 201, an ID card manufacturing device 210 is used. For example, the ID card manufacturing device 210 comprises a data input section 211, an original image data capture section 212, a two-dimensional bar code creating section 213, a specific color input section 214, a two-dimensional bar code split section 215, a synthesizing position designating section 216, an image data synthesizing section 217, a print data conversion section 218, a printing section 219, and a storage section 220, as shown in FIG. 9.

The data input section 211 is for inputting necessary information, for example, character data (text data), e.g., a particular person's name such as the card owner's name, address, date of birth, company ID number and the like, and image data of the face picture 205.

The original image data capture section 212 is controlled by a CPU (not shown) and performs capture processing of the image data of the face picture 205 which were input through the data input section 211 and data of the background image (space image) 206 which were created in advance by Computer Graphics, i.e., CG.

The two-dimensional bar code creating section 213 is controlled by a CPU (not shown) and performs two-dimensional bar code processing of desired information, e.g., the character data input through the data input section 211, according to a predetermined manner.

The specific color input section 214 is for inputting the information data of the specific color for the two-dimensional bar codes 207, for example, the data of color comprising 70% cyan, 40% magenta, 10% yellow and 10% black, or the like.

The two-dimensional bar code split section 215 is controlled by a CPU (not shown) and splits the unit of the two-dimensional bar codes 207 into a predetermined number of pieces, e.g., into four pieces, each to have a predetermined size, as shown in FIG. 8. Thereafter, one or more of the split pieces of two-dimensional bar codes, for example, the split piece 207d is scaled down into a predetermined size to make a scaled-down split piece of two-dimensional bar codes.

The synthesizing position designating section 216 which is controlled by a CPU (not shown), designates each central position and each size of the region from respective central position, of the split pieces 207a, 207b and 207c of two-dimensional bar codes and of the scaled-down split piece 207d, to be synthesized on the original image 204 by using x and y coordinates formed on the original image. Thus, the positions of the split pieces 207a, 207b and 207c and the scaled-down split piece 207d to be synthesized on the space image 206 and the face image 205, in the original image 204 are determined.

The image data synthesizing section 217 which is controlled by a CPU (not shown), extracts portions in the regions of the original image data, designated by the synthesizing position designating section 216, having the specific color which is input through the specific color input section 214 and changes the color data of the designated portions to a color other than the specific color. Thereafter, the data of the split pieces 207a, 207b and 207c and the data of the scaled-down split piece 207d, of two-dimensional bar codes which are created by the two-dimensional bar code creating section 3213 are superimposed on the data of the original image, to replace the color data of every pixel which superimposes on the two-dimensional bar codes, to the color data of the specific color.

The print data conversion section 218 is controlled by a CPU (not shown) and performs conversion of the image data synthesized at the image data synthesizing unit 217 to printing data.

The printing section 219 prints a synthesized image with colors which are determined, on the card substrate 203 according to the printing data.

The storage section 220 stores the data of the two-dimensional bar codes 207 created by the two-dimensional bar code creating section 213, the size of and how to combine (arrangement relationship therebetween) the split pieces 207a, 207b, 207c and 207d, the size of the scaled-down split piece 207d, the scale-down ratio, the information of positions on the ID card 201, for the split pieces 207a, 207b and 207c of two-dimensional bar codes and of the scaled-down split piece 207d which are designated by the synthesizing position designating section 216, the information of the specific color input through the specific color input section 214, the data of image synthesized by the image data synthesizing section 217 and the like.

As described above, the ID card 201 is manufactured by splitting a unit of two-dimensional bar codes 207 into a plurality of pieces, scaling down one of the split pieces of two-dimensional bar codes, synthesizing the data of the split pieces 207a, 207b and 207c and the data of the scaled-down split piece 207d, of two-dimensional bar codes at desired positions and in desired regions on the original image 204, which are designated by the synthesizing position designating section 216, to make data of synthesized image, by the image data synthesizing unit 217 and printing the data of synthesized image on the card substrate 203.

In the embodiment, because entirety of unit 207 of two-dimensional bar codes is not obtained until the scaled-down split piece 207d is scaled up by the original size thereof and thereafter four split pieces 207a, 207b, 207c and 207d of two-dimensional bar codes are appropriately combined, no person can obtain the complete unit 207 of two-dimensional bar codes unless the person knows the synthesizing positions and regions, the particular color of two-dimensional bar codes, the scale-down ratio of the scaled-down split piece, and the arrangement relationship between the split pieces 207a, 207b, 207c and 207d. According to the embodiment, it is possible to improve security for the two-dimensional bar codes 207 and to increase flexibility for design of the ID card 1 because the split pieces 207a, 207b, 207c and 207d of two-dimensional bar codes can be arranged at desired positions on the original image 204.

Figure 10:
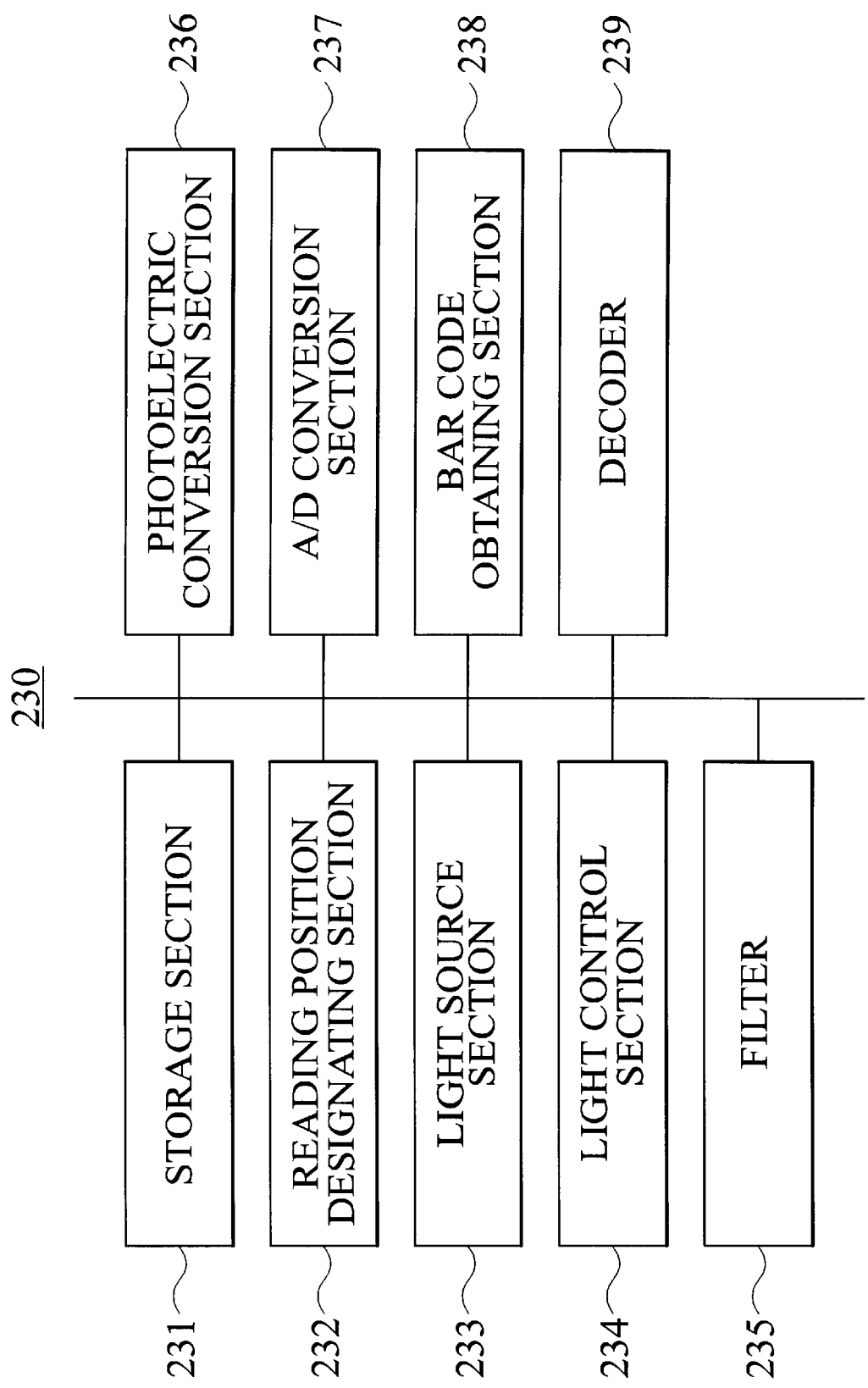
FIG. 10 is a block diagram showing a structure of the principal portion of a bar code reading device.

Next, an embodiment of the bar code reading device 230 for reading the two-dimensional bar codes 207 in the synthesized image 202 on the above-described ID card 201 will be explained with reference to FIG. 10.

The bar code reading device 230 comprises a storage section 231, a reading position designating section 232, a light source section 233, a light control section 234, a filter 235, a photoelectric conversion section 236, an A/D conversion section 237, a bar code obtaining section 238 and a decoder 239.

The storage section 231 stores the regions 202a to 202d for the split pieces 207a, 207b and 207c of two-dimensional bar codes and the scaled-down split piece 207d, in the synthesized image data, that is, the central positions and the regions (size) which are measured on the basis of the central positions, of the split pieces 207a, 207b, 207c and 207d by using x and y coordinates on the synthesized image data, the scale-down ratio of the scaled-down split piece 207d, how to combine the split pieces 207a, 207b, 207c and 207d, to obtain the original unit 207 of two-dimensional bar codes before splitting, and the like.

The reading position designating section 232 designates the regions 202a to 202d on the synthesized image to be illuminated in order to read the split pieces 207a, 207b and 207c of two-dimensional bar codes and the scaled-down split piece 207d, on the basis of the data stored in the storage section 231. The designation is carried out on the basis of the central positions, e.g., the starting point of the arrow, for the region 202b in FIG. 6, of the split pieces 207a, 207b, 207c and 207d by x and y coordinates and the regions (the lengths from the starting point to the rectangular sides), e.g., the region 202b enclosed by a broken line in FIG. 6.

The light source section 233 in the bar code reading device 230 emits a light with a frequency corresponding to the specific color of the two-dimensional bar codes 207 which is controlled by the light control section 234, to provide an illumination thereof to the regions 202a to 202d on the synthesized image 202 of the ID card 201.

The light control section 234 is controlled by the CPU (not shown), and controls the light source section 233 to provide an illumination light having a distribution of specific frequency corresponding to the specific color so that the reading device can receive a strong reflected light of the specific color.

The filter 235 separates the reflected light from the synthesized image 202 of the ID card 201 into frequency components.

The photoelectric conversion section 236 converts the light of each frequency component separated by the filter 235 to an electric signal.

The A/D conversion section 237 converts the analog electric signal converted by the photoelectric conversion section 236 to digital signal.

The bar code obtaining section 238 is controlled by a CPU (not shown) and obtains the data of split pieces of the two-dimensional bar codes with a specific color by reversing the digital electric signal from the A/D conversion unit 237. Thereafter, the bar code obtaining section 238 scales up the scaled-down split piece 207d of two-dimensional bar codes to the original size thereof, and combining the data of the split pieces 207a, 207b, 207c and 207d of two-dimensional bar codes in a pre-designated combination manner, on the basis of the data stored in the storage section 231, to obtain the entirety of the original two-dimensional bar codes before splitting.

The decoder 239 decodes to read a predetermined information in the two-dimensional bar codes obtained by the bar code obtaining section 238.

When the entirety of the two-dimensional bar codes cannot be read by a single specific color, it can be read by repeatedly performing the above-described reading operations for another specific color.

As described above, in the bar code reading device 230 of the embodiment, first, the specific regions 202a to 202d on the synthesized image 202 of the ID card 201 is designated. Then, a light with the specific color which is the same as the one of the split pieces of two-dimensional bar codes hidden in the regions 202a to 202d is illuminated onto the designated regions. From the data of light reflected from the specific regions, the data of the split pieces of two-dimensional bar codes 207a to 207d are extracted. After the scaled-down split piece 207d of two-dimensional bar codes is scaled up to its original size, all of the split pieces 207a, 207b, 207c and 207d of two-dimensional bar codes are combined by a pre-designated combination manner. Thus, the unit of original two-dimensional bar codes 207 before splitting can be read.

In the above embodiment, although the light with the specific color is illuminated to only the designated regions 202a to 202d, it may be illuminated to the entire surface of the synthesized image 202 and thereafter only the data of light reflected from the designated regions 202a to 202d may be obtained from the entire reflected light to extract the split pieces 207a to 207d of the two-dimensional bar codes with the specific color.

Figure 11:
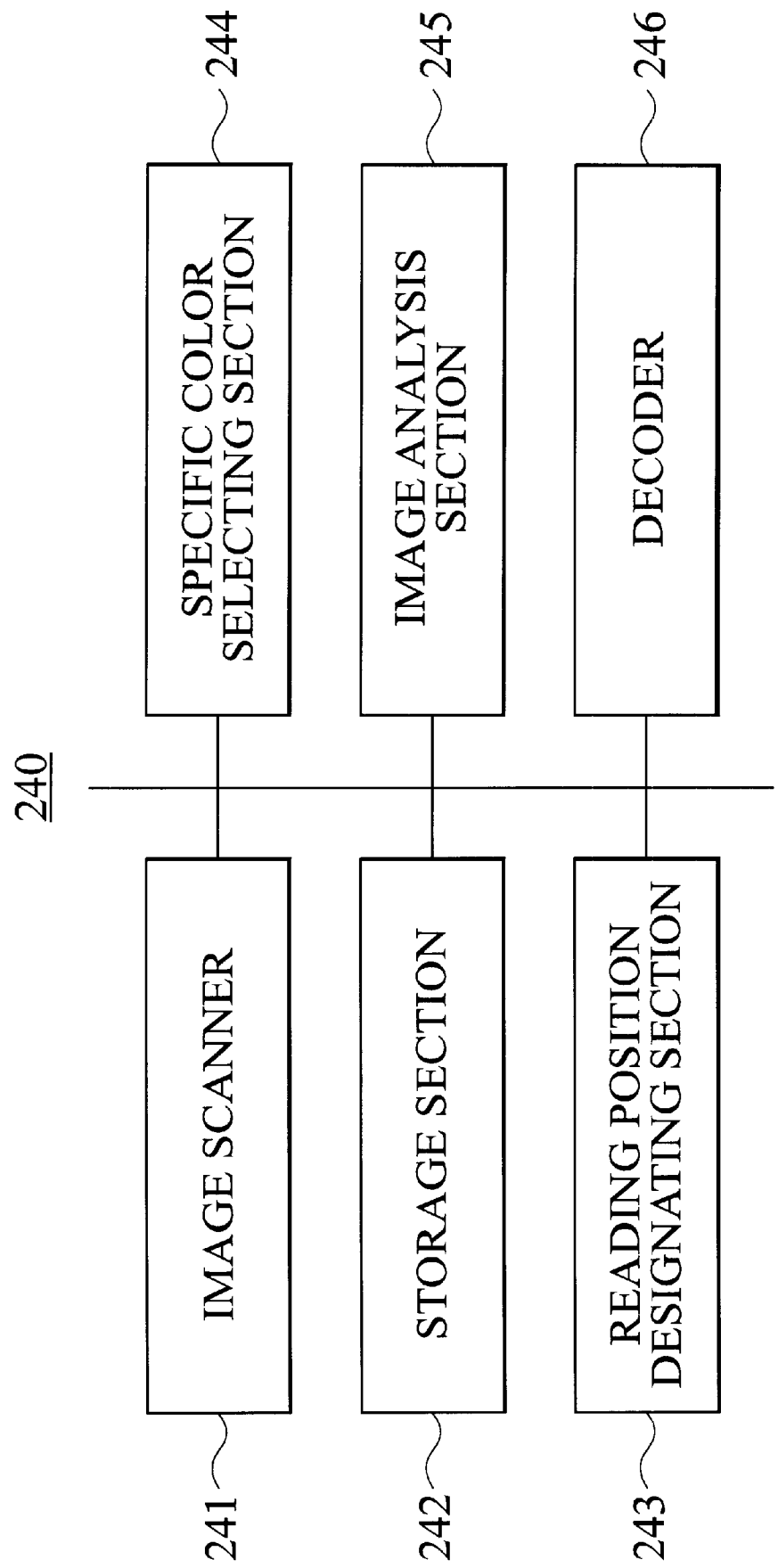
FIG. 11 is a block diagram showing a structure of the principal portion of another bar code reading device.

The bar code reading device of the invention may be provided with a scanner, as shown in FIG. 11.

The bar code reading device 240 shown in FIG. 11 comprises an image scanner 241, a storage section 242, a reading position designating section 243, a specific color selection section 244, an image analysis section 245, and a decoder 246.

The image scanner 241 is provided with a CCD sensor (not shown), and converts information of an image to digital signal every pixel and outputs the converted image data to the image analysis section 3245.

Because the storage section 242 has approximately the same function as the storage section 231 of the bar code reading device 230, the explanation therefore is omitted.

The reading position designating section 243 is controlled by a CPU (not shown) and designates the regions 202a to 202d on the synthesized image to read the split pieces 207a, 207b and 207c of two-dimensional bar codes and the scaled-down split piece 207d, on the basis of the data stored in the storage section 242. The designation is carried out on the basis of the central positions of the split pieces by x and y coordinates and the regions, e.g., the lengths from the central positions to the rectangular sides.

The specific color selection section 244 is controlled by a CPU (not shown) and selects the specific color for the split pieces 207a, 207b and 207c and the scaled-down split piece 207d, of two-dimensional bar codes.

The image analysis section 245 is controlled by a CPU (not shown) and extracts data of an image having the specific color which is selected by the specific color selection section 244, from the image data captured by the image scanner 241, on the basis of the positional information designated by the reading position designating section 243. The image analysis section 245 scales up the scaled-down split piece of two-dimensional bar codes to the original size thereof, and combines the data of the all split pieces of two-dimensional bar codes, on the basis of the scaled-down ratio, the combination manner and the like which are stored in the storage section 242, to obtain the entire unit of the original two-dimensional bar codes 207 before splitting.

Each unit of the original two-dimensional bar codes may have a plurality of specific colors.

The decoder 246 decodes the two-dimensional bar codes obtained by the image analysis section 3245 to obtain a predetermined information in the two-dimensional bar codes.

As described above, in the embodiment, the data of the two-dimensional color bar codes are extracted by obtaining the image of the specific color from the captured color image data and are decoded to obtain the information contained therein.

According to the ID card 201 of the embodiment of the invention, because the unit 207 of two-dimensional bar codes with a specific color is split into plural pieces and at least one of the split pieces is scaled down and included in the image data, no person can obtain the complete unit 207 of two-dimensional bar codes unless the person knows the synthesizing positions and regions, of four split pieces 207a, 207b, 207c and 207d, the particular color of two-dimensional bar codes, the scale-down ratio of the scaled-down split piece, and the arrangement relationship between the split pieces. According to the embodiment, it is possible to improve security for the two-dimensional bar codes 207 and to prevent illegal reading of the information codes.

Because the information codes are split in pieces and are hidden in the image, and therefore the entirety of the information codes cannot be obtained until combining the split pieces of information codes appropriately, the information code product according to the invention provides excellent security in comparison with a product having exposed information codes, e.g., a conventional two-dimensional bar codes product, a magnetic card or the like.

Because of using two-dimensional bar codes 207 as the information codes, it is possible to increase the information amount and to make the image data easily. Further, it is possible to increase flexibility for design of the ID card 201 because the split pieces 207a, 207b, 207c and 207d of two-dimensional bar codes can be arranged at desired positions on a desired original image 204.

Figure 12:
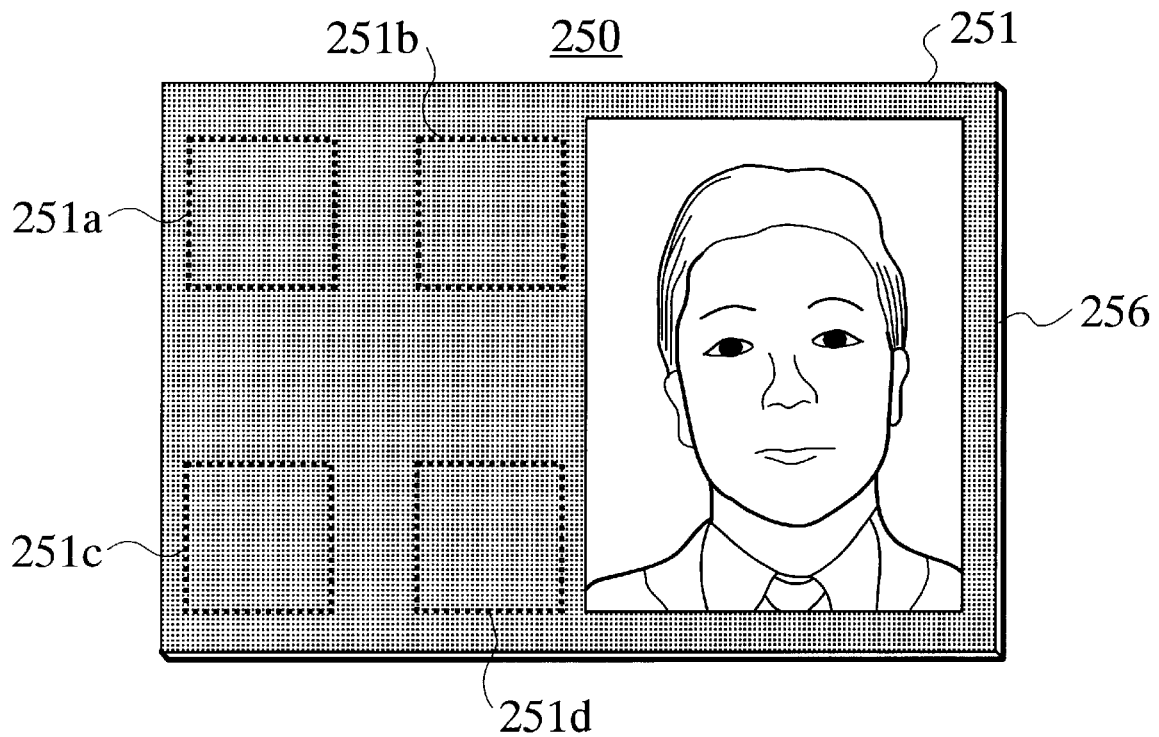
FIG. 12 is a view showing an ID card according to another embodiment of the invention.
Figure 13A:
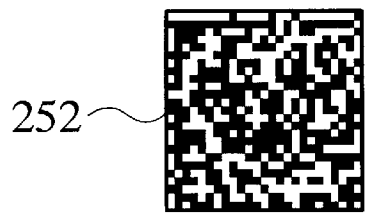
FIGS. 13A–13D are views showing four units of two-dimensional bar codes before being split, which are hidden in the image on the ID card.
Figure 13B:
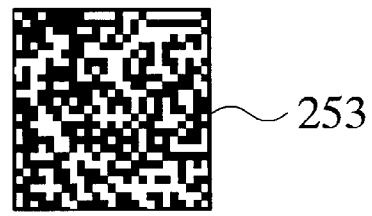
Figure 13C:
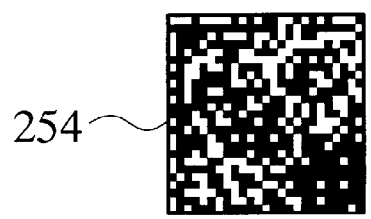
Figure 13D:
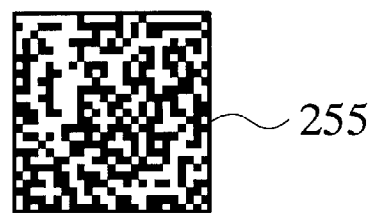

FIG. 12 shows an ID card, according to another embodiment of the information code product of the present invention. The ID card 250 comprises a card substrate 256 and a synthesis image portion 251 having a synthesis image including an owner's face picture, which is printed on the card substrate 256. Prepared four different units 252–255 of two-dimensional codes, as shown in FIGS. 13A–13D, are synthesized with data of an original image, in four regions 251a–251d at desired positions on the card substrate 256. The four units 252–255 of two-dimensional codes include specific data, for example, address, name, date of birth, and telephone number, which are coded, respectively.

Each of the units 252–255 of two-dimensional bar codes has a particular color containing a particular color ratio of cyan, magenta, yellow and black. The particular colors of four units of two-dimensional bar codes are different from one another.

In order to manufacture the ID card 250, almost the same method as the one for the ID card 201 shown in FIG. 6 can be used except that the two-dimensional bar code split section 3215 in the ID card manufacturing apparatus 210 is not used and that different colors are used for the four units 252–255 of two-dimensional bar codes.

In order to read the units 252–255 of two-dimensional bar codes from the synthesis image portion 251 of the ID card 250, the same reading method as the one for the ID card 201 can be used except that lights with different frequency corresponding to the different particular colors can be used for the four units 252–255 of two-dimensional bar codes, in the afore-described bar code reading device 230 and that no scale-up of the two-dimensional bar codes nor combining of the data is performed in the bar code obtaining section 238.

In the bar code reading device 240, the same reading method can be also used except that different particular colors are selected for the four units 252–255 of two-dimensional bar codes, in the afore-described specific color selecting section 244 and that no scale-up of the two-dimensional bar codes nor combining of the data is performed in the image analysis section 245, in order to read the four units 252–255 of two-dimensional bar codes by using the reading device 240.

According to the ID card 250, because a plurality of units 252–255 of information codes are arranged in desired regions 251a–251d at desired positions in data of an image and have specific colors different from one another, even if a person could specify the position and region on the original image, of one unit of information codes, it is possible to make the construction for the person not to read other units of information codes. Therefore, it is possible to increase the information amount therein and to improve security for the information codes.

In the above-described embodiments, as the information code product, only a company ID and personal ID card are explained, it is not limited to them. The information code product of the invention can be applied to cash card for bank, student ID, card for using in an intelligent building, health and medical service card, system-access card, data carrier card and the like. Further, the information code product, e.g., printed article, of the invention can be applied to various types of printed articles, e.g., covering paper with bar codes, codes for book or the like, printed article having a company's logo or the like, including codes. Accordingly, it is possible to increase flexibility for design extremely. The present invention can be also used for a driver's license, a health insurance card, paper money and the like.

The plurality of units of information codes with particular colors may be various information in different categories, for example, credit information, information relating to health insurance, annuity or the like. Thereby, it is possible to make a card including various types of information.

In the above embodiments, only character data are shown as information of two-dimensional codes, it is not limited to this. For example, it is possible to synthesize data of a coded face picture image with data of another image. Accordingly, it is possible further to improve security for the information codes.

It is possible further to improve information security by forming a unit of two-dimensional codes by combining a plurality of particular colors.

The authentication system according to an embodiment of the present invention will be explained, with reference to the drawings.

Figure 14:
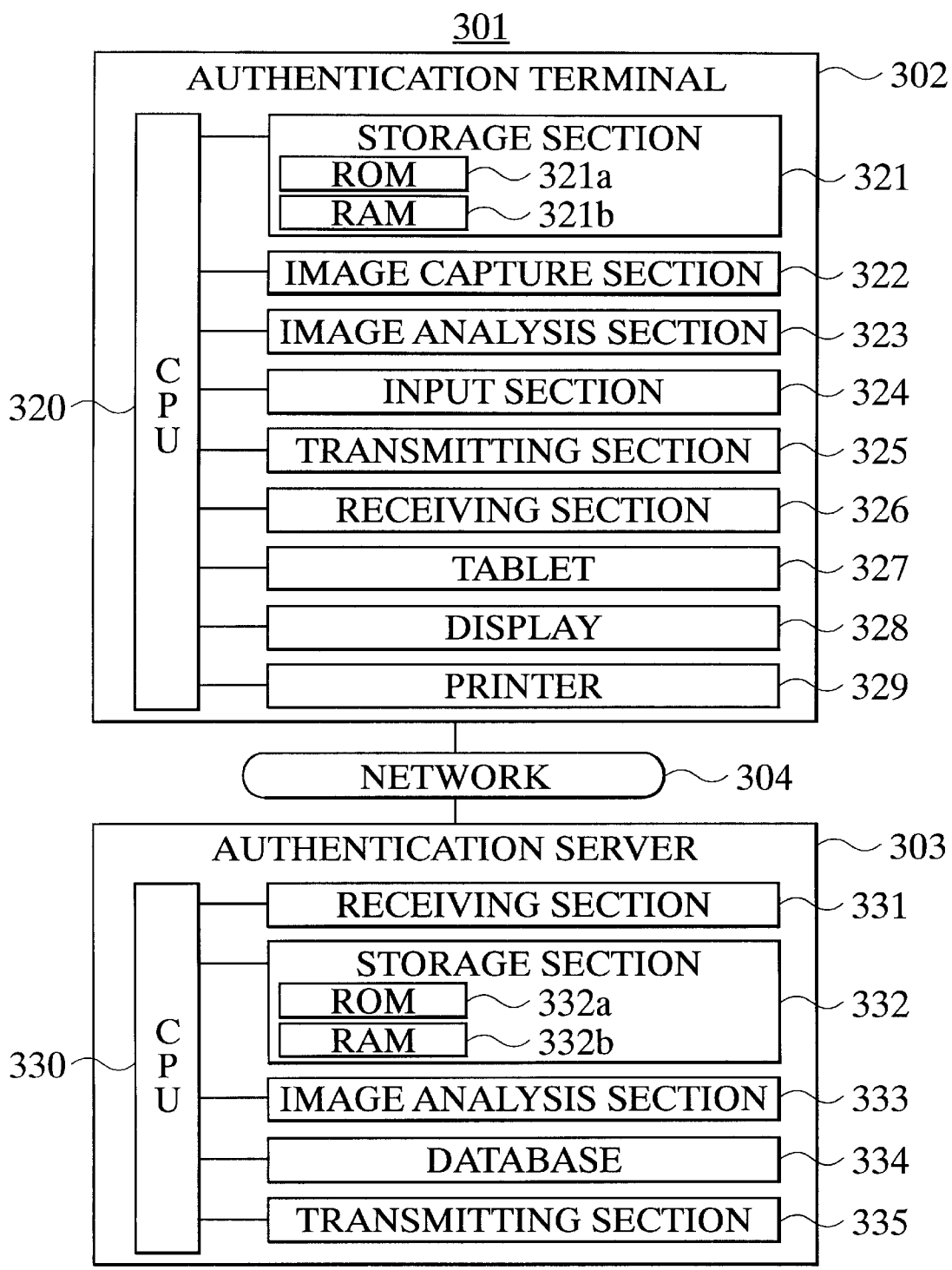
FIG. 14 is a block diagram showing an embodiment of a credit card authentication system of the invention.

FIG. 14 shows a credit card authentication system, according to an embodiment of the invention.

Figure 15:
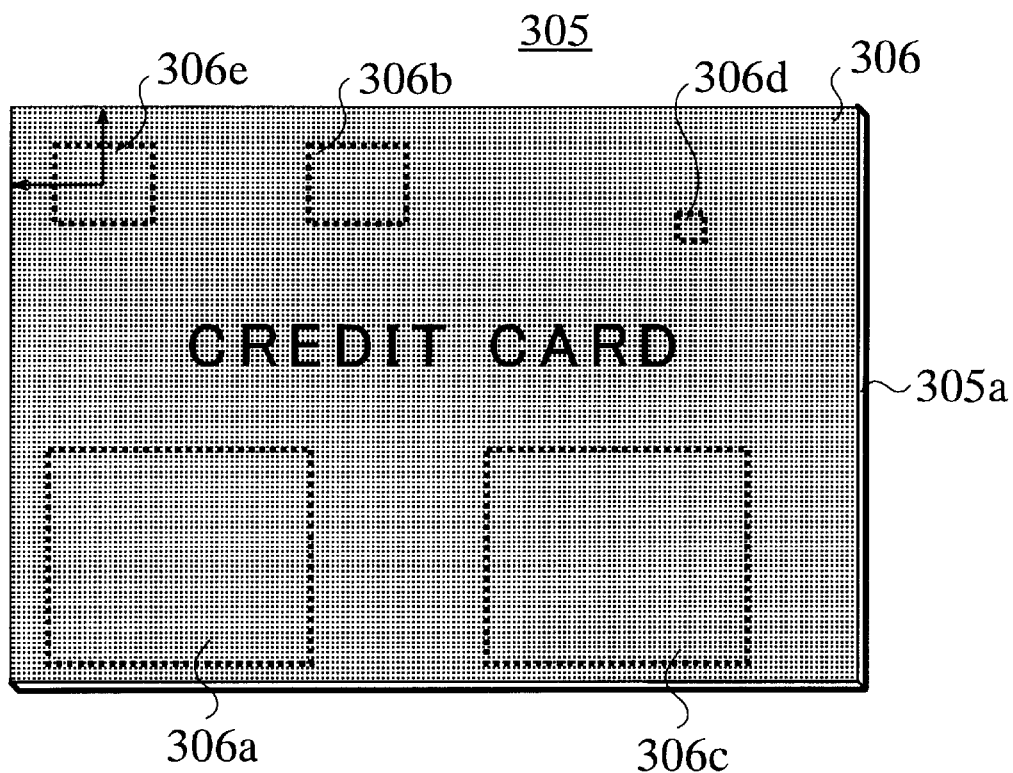
FIG. 15 a view showing a credit card used in the credit card authentication system of the invention.

The credit card authentication system 301 comprises an authentication terminal 302 and an authentication server 303 which is interconnected to the authentication terminal through a network 304. For example, the credit card authentication system 301 is used when a user of a credit card 305 which is shown in FIG. 15 buys a goods or receives a service from a credit card member shop having an authentication terminal 302 and uses a credit card 305 for the payment. The authentication for the user of the card 305 is carried out by the authentication server 303 through the authentication terminal 302. The network 304 is, for example, the one using a public telephone line.

Figure 16A:
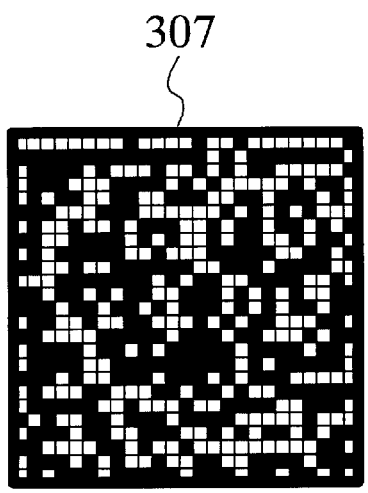
FIGS. 16A and 16B are views showing different units of two-dimensional bar codes, which are hidden in the image on the credit card.
Figure 16B:
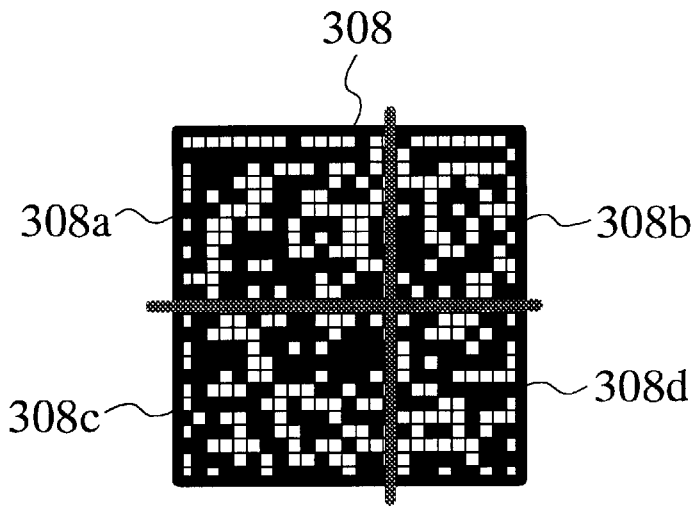

The card 305 comprises a card substrate 305a and a code including image 306 which is printed on the substrate 305a. The code including image 306 includes a first unit of identifying information two dimensional codes with at least a first specific color, including coded identifying information for identifying the owner of the card 305, e.g., passwords, and a second unit of owner's information two dimensional codes with at least a second specific color, including coded information for the owner other than the coded identifying information, e.g., the name, a face picture, the date of birth, signature, and the like. In the embodiment, the first unit 307 of two-dimensional bar codes including the coded passwords of the owner and the second unit 308 of two-dimensional bar codes including the owner's information, which are shown in FIGS. 16A and 16B, are hidden in the code including image 306. The meaning "units of two-dimensional bar codes are hidden" is that the two-dimensional bar codes cannot be recognized so long as a person sees the code including image 306 ordinarily.

The second unit 308 of two-dimensional bar codes including the owner's information is split into four pieces 308a to 308d, as shown in FIG. 16B. One 308d of the four split pieces 308a to 308d of two-dimensional bar codes is scaled down and is arranged in the scaled-down state in the image 306. The positions and regions for arrangement 306a to 306d of the four split pieces 308a to 308d of two-dimensional bar codes on the image 306 of the card are determined according to random numbers corresponding to the passwords, respectively. The position and region for arrangement 306e of the first unit 307 of two-dimensional bar codes including the coded passwords on the image can be determined arbitrarily. In FIG. 15, although the positions and regions for arrangement 306a to 306e are indicated by using broken lines, in practice, such broken lines are not formed on the card 305.

Each of the first and second units of two-dimensional bar codes 307 and 308 has a particular color containing a predetermined color ratio of cyan, magenta, yellow and black. The colors of four split pieces 308a to 308d of two-dimensional bar codes may be different from one another.

The authentication terminal 302 comprises a central processing unit (PCT) 320, a storage section 321, an image capture section 322, an image analysis section 323, an input section 324, a transmitting section 325, a receiving section 326, a tablet 327a display 328, and a printer 329. The terminal 302 is provided with a modem (not shown) which is connected with the network 304, for communicating with the authentication server 303.

The CPU 320 controls each of the sections 321–329 and judges whether the passwords input by the user matches the one obtained from the image analysis section 323. When only they matches, the CPU 320 gives an instruction to the transmitting section 325, to send the data of the code-including image captured by the image capture section 322 together with the passwords, the data of owner's use, the individual number of the authentication terminal 302 and the like, to the authentication server 303 through the network 304.

The storage section 321 comprises memories including a ROM (read only memory) 321a, a RAM (random access memory) 321b and the like. ROM 321a stores the arrangement information of the arrangement position 306e of the first unit 307 of two-dimensional bar codes including the coded passwords on the image 306 on the card, that is, the central position for the region 306e by x and y coordinates and the size of the region (the lengths from the starting point to the rectangular sides), and the particular color thereof, the random numbers corresponding to the passwords, the arrangement information of the arrangement positions 306a–306d for the split pieces 308a to 308d of two-dimensional bar codes, which are determined by the random numbers, the particular color thereof, the scaled-down ratio of the scaled-down split piece 308d, the combination manner for the split pieces 308a, 308b, 308c and 308d of two-dimensional bar codes, the individual number of the authentication terminal 302 and the like. ROM 321a also stores the program for the CPU 320 to control each of the sections 321–329.

ROM 321a is a volatile storage. Into the ROM 321a, a weak current is always supplied from a power supply (not shown). If the supply of current is stopped, the information and program stored therein disappear.

RAM 321b stores the owner's passwords, the image data captured from the card which will be described later, the two-dimensional bar codes, the data of use by the user, and the like temporarily.

The image capture section 322 has an image sensor, e.g., CCD or the like, and captures the code including image 306 on the card 305 to convert to digital data at every pixel and sends the converted image data to the image analysis section 323.

The image analysis section 323 extracts an image with the specific color corresponding to the passwords from the data of the code including image 306, on the basis of the arrangement information and the specific color, for the arranged position 6e of the unit 307 of two-dimensional bar codes, which are stored in ROM 321a, to obtain the two-dimensional bar codes 307. The obtained two-dimensional bar codes 307 is decoded to obtain the passwords.

When the receiving section 326 which will be explained later has received an operation authorization signal from the authentication server 303, for authorizing to decode the of two-dimensional bar codes 308 including the name, a face picture, the date of birth, signature, and the like which are coded, the image analysis section 323 extracts an image with the specific color from the data of the code including image 306, on the basis of the arrangement information and the specific color, for the arranged positions 306a–306d of the unit 308 of two-dimensional bar codes, which are stored in ROM 321a. Thereafter, the section 323 scales up the scaled-down split piece 306d of two-dimensional bar codes to the original size thereof on the basis of the scaled-down ratio of the scaled-down split piece 306d which is stored in ROM 321a, and combines the data of the split pieces 308a, 308b, 308c and 308d of two-dimensional bar codes in a pre-designated combination manner which is stored in ROM 321a, to obtain the entirety of the original two-dimensional bar codes 308 before splitting. The obtained two-dimensional bar codes 308 are decoded to obtain the owner's information and sent to the display 28.

Through the input section 324, the user of the card inputs the passwords and the like, and the member shop side inputs data of use, e.g., the goods bought by the user, the price thereof, the service supplied to the user, the price thereof, and the like.

The transmitting section 325 sends the passwords, the data of the code including image 306, the individual number stored in the storage section 321, and the data of use, to the authentication server 303 through the network 304.

The receiving section 326 receives an operation authorization signal and a use approval signal for approving the use content by the user, or a rejection message signal for informing of "the transaction incomplete, for example, because of the use content being over the maximum usable amount, from the authentication server 303 through the network 304.

The tablet 327 is an input device for inputting a character such as the user's signature. The signature can be input into the tablet 327 or can be also input into the display 328 of the authentication terminal 302 directly.

The display 328 displays the user's signature which was input through the tablet 327 and the owner's name, a face picture, the date of birth, signature, and the like which are decoded by the image analysis section 323. By comparing the user's signature with the owner's signature on the display 328, it is possible to confirm if the user's signature is correct. Such a confirmation can be performed by CPU 320 or a person working for the member shop.

The display 328 also displays a message for demanding the user to input the content, e.g., purpose, of use of card, an error message when the passwords by the user do not coincide with the stored one, a rejection message when the receiving section 326 receives a rejection message signal of "the transaction incomplete from the authentication server 303, and the like.

The printer 329 prints the content of use for the user which was confirmed by the authentication server 303 to publish a specification of use.

Next, the construction of the authentication server 303 will be explained.

The authentication server 303 is a computer apparatus, e.g., a personal computer, a work-station and the like, which comprises a CPU 330, a receiving section 331, a storage section 332, an image analysis section 333, a database section 334, a transmitting section 335 and the like.

The CPU 330 controls each of the sections 331–335. The CPU 330 also judges whether the request of the user, i.e., the content of use received by the receiving section 331, can be authenticated on the basis of the owner's history of use, the maximum amount of credit for the owner, and the like which are found by referring to the database in the database section 334 according to the owner's information which were read by the image analysis section 333. The CPU 330 also instructs the transmitting section 35 to send the results of authentication to the authentication terminal 302.

The receiving section 331 receives the passwords, the data of the code including image 306, the content of use (user's request), and the individual number of the authentication terminal, which are sent from the authentication terminal 302 through the network 304.

The storage section 332 comprises memories including a ROM 332a, a RAM 332b and the like. ROM 332a stores the arrangement information of the arrangement position 306e of the first unit 307 of two-dimensional bar codes including the coded passwords on the image 306 on the card, and the particular color thereof, the random numbers corresponding to the passwords, the arrangement information of the arrangement positions 306a–306d for the split pieces 308a to 308d of two-dimensional bar codes, which are determined by the random numbers, the particular color thereof, the scaled-down ratio of the scaled-down split piece 308d, the combination manner for the split pieces 308a, 308b, 308c and 308d of two-dimensional bar codes, and the like. ROM 332a also stores the program for the CPU 320 to control each of the sections 331–335.

RAM 332b stores the owner's passwords, the image data and the data of use by the user, and the like which were sent from the authentication terminal 302, temporarily.

The image analysis section 33 extracts an image with the specific color from the data of the code including image 306 which are received by the receiving section 331, on the basis of the arrangement information and the specific color, for the arranged positions 306a–306d which were determined by the random number corresponding to the passwords which is stored in ROM 332a. Thereafter, the section 333 scales up the scaled-down split piece of two-dimensional bar codes to the original size thereof on the basis of the scaled-down ratio of the scaled-down split piece which is stored in ROM 332a, and combines the data of the split pieces 308a, 308b, 308c and 308d of two-dimensional bar codes in a pre-designated combination manner which is stored in ROM 332a, to obtain the entirety of the original two-dimensional bar codes 308 before splitting. The obtained two-dimensional bar codes 308 are decoded to obtain the owner's information, e.g., the owner's name, the face picture, the date of birth, signature, and the like.

In database section 334, the owner's passwords, name, address, telephone number, date of birth, signature, history of use, the maximum amount of credit for the owner, and the like are stored. When a content of use and the individual number of the authentication terminal are sent from the authentication terminal 302 to the receiving section 331, these data are added into the history of use.

When CPU 330 judges that authentication is accepted, the transmitting section 335 sends an operation authorization signal and a use approval signal for approving the use content by the user, to the authentication terminal 302 through the network 304.

When CPU 330 judges that authentication is denied, the transmitting section 335 sends an authorization denied signal to the authentication terminal 302.

Next, the operation of the system will be explained.

Figure 17A:
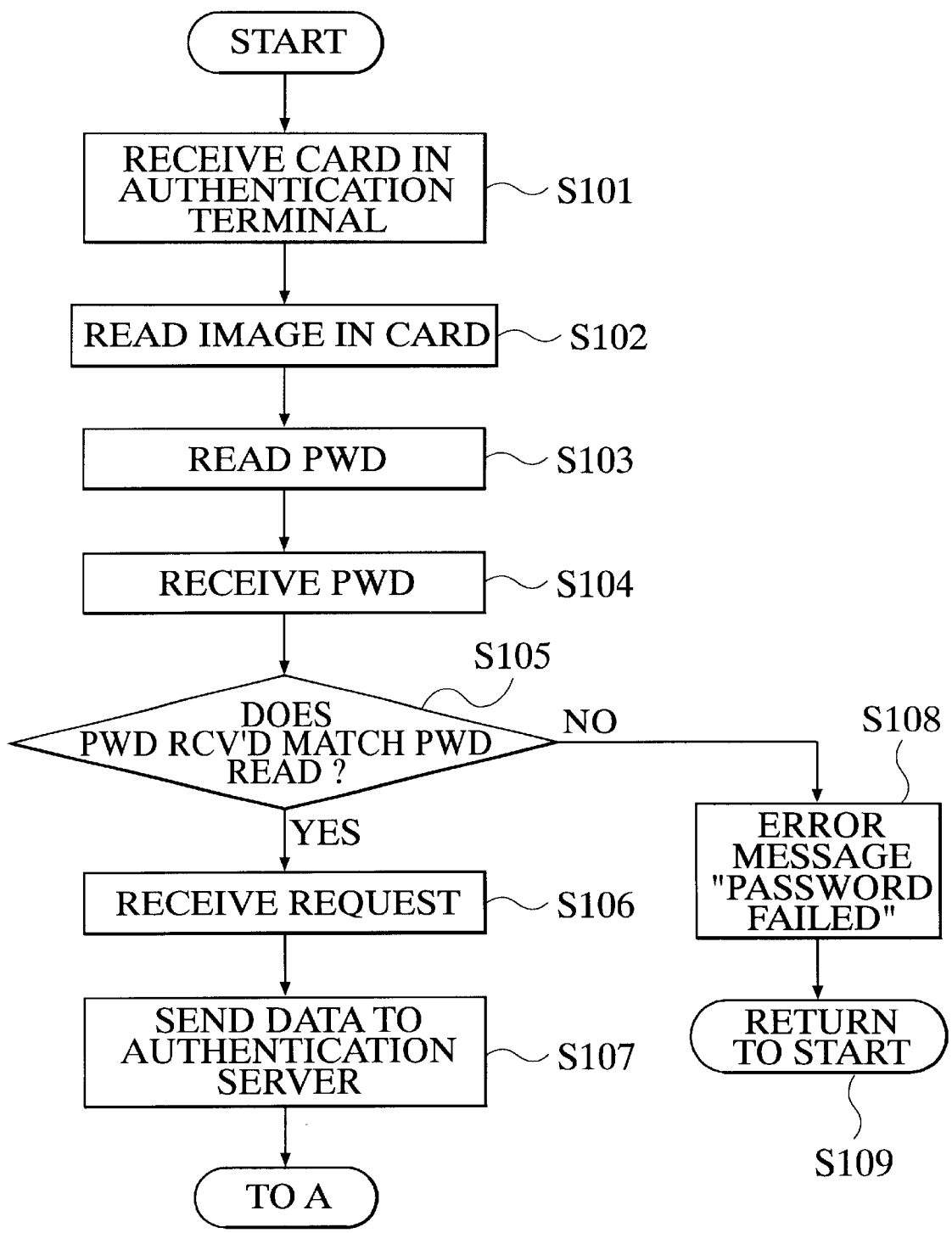
FIG. 17 is a flow chart for explaining the function of the authentication terminal of the invention.
Figure 17B:
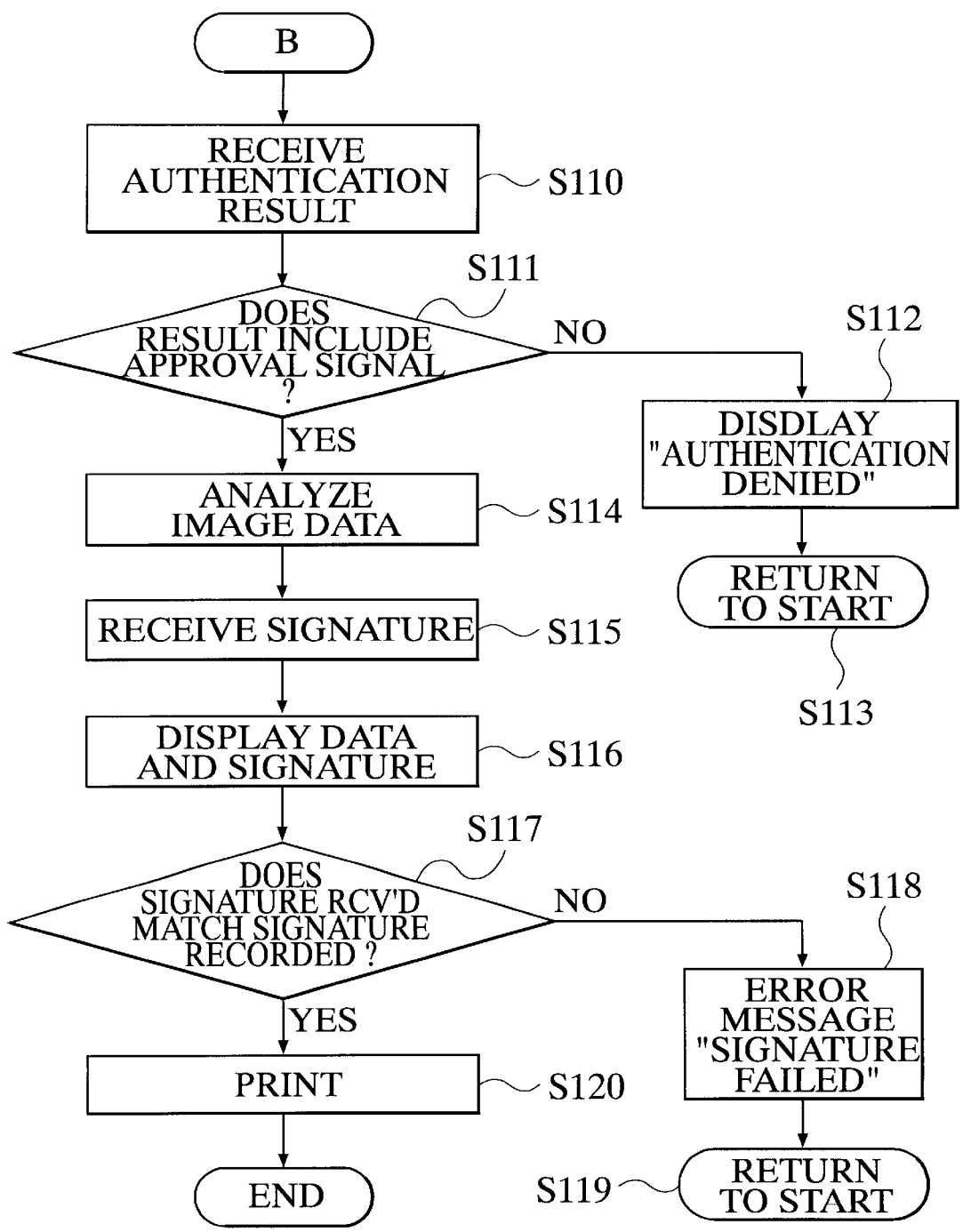

FIG. 17 is a flow chart for showing the operation of the authentication terminal 302, and FIG. 18 is a flow chart for showing the operation of the authentication server 303.

When the authentication terminal 302 receives a credit card 305 that a user hopes to use, as shown in step S101, the image capture section 322 of the terminal captures the code including image 306 on the card 305, as shown in step S102. The image analysis section 323 extracts an image with the specific color corresponding to the unit 307 of two-dimensional bar codes including the coded passwords, which is hidden in the image at the arranged position 306e, to obtain the two-dimensional bar codes 307. The obtained two-dimensional bar codes 307 is decoded to obtain the passwords, as shown in step S103.

When passwords are input into the input section 324 by the user of the card 305, as shown in step S104, CPU 320 judges whether the passwords input by the user matches the one read from the card 305, as shown in step S105. When they matches, the display 328 displays a message for demanding to input a content of use's request for the card 305. After the content of use's request is received through the input section 324, as shown in step S106, the transmitting section 325 sends the owner's passwords, data of the code including image, the user's request and the individual number of the authentication terminal to the authentication server 303 through the network 304, as shown in step S107.

When the passwords by the user do not coincide with the stored one, an error message "Passwords Failed" is displayed in the display 328, as shown in step S108, and the operation returns to Start, as shown in step S109. In this case, the authentication terminal 302 may demand the user to insert the card and to input the passwords again, or may inform of it as a denied card 305 to a management company managing the authentication server 303.

When the receiving section 331 in the authentication server 303 receives the data of the code including image 306 from the authentication terminal 302 through the network 304, as shown in step S201, the image analysis section 333 analyzes the received data to read the owner's information, as shown in step S202. That is, the image analysis section 333 extracts an image with the specific color from the image data, on the basis of the arrangement information and the specific color, for the arranged positions 306a–306d which were determined by the random number corresponding to the passwords which is stored in ROM 332a. Thereafter, the section 333 scales up the scaled-down split piece of two-dimensional bar codes to the original size thereof on the basis of the scaled-down ratio of the scaled-down split piece which is stored in ROM 32a, and combines the data of the split pieces 308a, 308b, 308c and 308d of two-dimensional bar codes in a pre-designated combination manner which is stored in ROM 332a, to obtain the entirety of the original two-dimensional bar codes 308 before splitting. The obtained two-dimensional bar codes 308 are decoded to obtain the owner's information, e.g., the owner's name, the face picture, the date of birth, signature, and the like.

Next, CPU 330 judges whether the request of the user, i.e., the content of use received by the receiving section 331, can be authenticated on the basis of the owner's history of use, the maximum amount of credit for the owner, and the like which are found by referring to the database in the database section 334 according to the owner's information which were read by the image analysis section 333, as shown in step S203.

When CPU 330 judges that an authentication is approved, CPU 330 sends an operation authorization signal which authorizes the authentication terminal 302 to read a predetermined portion or the entirety of the original two-dimensional bar codes 308 and a use approval signal for approving the use content by the user, as an authentication result, from the receiving section 331 to the authentication terminal 302 through the network 304, as shown in step S204. On the other hand, when CPU 330 judges that an authentication is denied, CPU 330 sends an authorization rejection signal as an authentication result, as shown in step S204.

When the authentication terminal 302 receives the authentication result from the authentication server 303 through the receiving section 326, as shown in step S110, the terminal 302 judges whether the authentication result includes an approval signal, i.e., an operation authorization signal for authorizing to decode the of two-dimensional bar codes, as shown in step S111. When no operation authorization signal is not included in the authentication result, that is, when the terminal 302 receives a rejection message signal as the authentication result, the display 328 displays a message indicating that the content of the request cannot be authenticated, as shown in step S112, and the operation returns to Start, as shown in step S113.

When an operation authorization signal is included in the authentication result, the image analysis section 323 extracts the unit 308 of two-dimensional bar codes which is approved to be read, from the image data and analyzes it, as shown in step S114. That is, the arrangement information and the specific color, for the arranged positions 6a–6d of the unit 308 of two-dimensional bar codes, which are stored in ROM 321a, are designated according to the passwords input by the user. On the basis of the designated data of the arrangement information and the specific color, the image analysis section 323 extracts an image with the specific color from the data of the code including image 306 and obtains the unit 308 of two-dimensional bar codes.

Thereafter, the section 323 scales up the scaled-down split piece 306d of two-dimensional bar codes to the original size thereof on the basis of the scaled-down ratio of the scaled-down split piece 306d which is stored in ROM 321a, and combines the data of the split pieces 308a, 308b, 308c and 308d of two-dimensional bar codes in a pre-designated combination manner which is stored in ROM 321a, to obtain the entirety of the original two-dimensional bar codes 308. The obtained two-dimensional bar codes 308 are decoded to obtain the owner's information, e.g., name, face picture, date of birth, signature, and the like. Then, the display 328 displays a message for demanding the user to input the signature.

When the tablet 327 receives a signature input by the user of the card, as shown in step S115, the display 328 displays the input signature and the owner's information obtained by analyzing the two-dimensional bar codes 308, as shown in step S116.

Thereafter, it is confirmed whether the signature input by the card user matches the owner's signature recorded or whether the user's face matches the displayed image of the owner's face picture, as shown in step S117. When they do not match, the display 328 displays an error message, as shown in step S118, and the operation returns to Start, as shown in step S119. When they do match in the step S117, the printer 329 prints a specification of the used content, as shown in step S120, and the operation of authentication is finished.

As described above, in the credit card authentication system 301 according to an embodiment of the invention, the authentication terminal 302 sends data of the code-including image captured from the card 305 to the authentication server 303, and the authentication server 303 analyzes the data of the code-including image to read the information. That is, the information is sent in a form of coded image data of two-dimensional bar codes 307 and 308 which are hidden in an image 306, to the authentication server 303. Accordingly, it is possible to prevent a leakage of information by interruption into the line or by conversion of the authentication terminal 302.

After the authentication server 303 performs an authentication for a user on the basis of the data of the code-including image sent from the terminal and send the authentication result signal to the authentication terminal 302, the terminal 302 can analyze the two-dimensional bar codes 308 which were approved to read by an approval signal, and obtains the owner's information to display it on the display 328. Because the information is communicated in a coded state and the owner's information is not displayed on the authentication terminal 302 unless an approval signal is obtained, it is possible to prevent the owner's information from illegal reading and to improve security for the information.

Because the owner's signature is coded in the two-dimensional bar codes 308 which are hidden in an image 306 of the card 305, that is, it is not displayed on the card 305, and the user inputs a signature into the input device such as a tablet 327 directly to display it on the display 328, without filling in a paper or the like, no traces of the signature remain on the paper or the like, therefore, it is difficult for a third person to imitate the signature. As a result, it is possible to prevent an illegal use of a card 305 or the like, and to provide an authentication system 301 which improve security for the information.

ROM 321a stores the arrangement information of the arrangement position 306e of the first unit 307 of two-dimensional bar codes including the coded passwords on the image 306 on the card, and the particular color thereof, the random numbers corresponding to the passwords, the arrangement information of the arrangement positions 306a–306d for the split pieces 308a to 308d of two-dimensional bar codes, which are determined by the random numbers, the particular color thereof. Because the owner's information is obtained by analyzing the image data on the basis of the arrangement information of the arrangement positions 306a–306d, it is not possible to obtain the owner's information unless a person knows the passwords. Therefore, it is difficult for a third person to read the information codes and is possible to improve the security for the authentication system 301.

Because ROM 321a is a volatile storage and if the supply of current into ROM 321a is stopped, the arrangement information of the owner's information codes stored in the storage section also disappear, it is impossible to read the data of the card 305 or the like when the storage section is removed from the terminal. Therefore, it is possible to prevent a leakage of information by misusing the authentication terminal.

Further, the authentication terminal 302 has an individual number itself and the individual number is sent to the authentication server 303 together with the data of the code-including image captured from the card 305, it is possible to prevent misuse of the authentication terminal 302 and to improve security for the information codes.

Although only a credit card authentication system is explained in the above embodiments, the invention is not limited to this. The authentication system of the invention can be applied also to the one of bank card, company ID card, student ID, card for an intelligent building, health, medical and administrative service card, system access card, data carrier card or the like.

In the above embodiments, although passwords are used as the identifying information, a signature may be also used.

The entire disclosure of Japanese Patent Application No. Tokugan 2000-137541 filed on May 10, 2000, of Japanese Patent Application No. Tokugan 2000-227602 filed on Jul. 27, 2000, and of Japanese Patent Application No. Tokugan 2000-248769 filed on Aug. 18, 2000, including specification, claims, drawings and summary are incorporated herein by reference in its entirety.

What is claimed is:

1. An information code product comprising a body having a code-including image formed thereon which includes at least one unit of information codes with one or more specific color, wherein the unit of information codes is adapted to be obtained by extracting an image with the specific color from the code-including image;

wherein the code-including image comprises a synthesis of an original image and at least one unit of information codes with one or more specific color; and wherein the specific color comprises color elements including at least cyan, magenta, yellow and black or at least red, green and blue, and is determined by using all of the color elements.

2. The information code product as claimed in claim 1, wherein the unit of information codes is a unit of two-dimensional bar codes with the one or more specific color.

3. The information code product as claimed in claim 1, wherein the unit of information codes is split into plural pieces, and the split pieces of information codes are arranged in desired regions at desired positions in the code-including image on the body and are adapted to obtain the unit of information codes by extracting pieces of images with the specific color from the code-including image in the desired regions at the desired positions and combining the pieces of images extracted.

4. The information code product as claimed in claim 3, wherein at least one of the split pieces of information codes is scaled down.

5. The information code product as claimed in claim 1, wherein the color elements include cyan, magenta, yellow and black.

6. The information code product as claimed in claim 1, wherein the color elements include red, green and blue.

7. An information code reading apparatus for reading information codes from an information code product with a code-including image which includes an original image and a unit of information codes with a specific color, in a desired region at a desired position, comprising:

an image capturing member for capturing data of the code-including image on the product, a color selection member for selecting the specific color of the information codes, an information code extracting member for extracting the information codes by extracting an image with the specific color from the data of the code-including image captured by the image capturing member, and a decoding member for decoding the information codes extracted by the information code extracting member;

wherein the specific color comprises color elements including at least cyan, magenta, yellow and black or at least red, green and blue, and is determined by using all of the color elements.

8. The information code reading apparatus as claimed in claim 7, further comprising:

a position designating member for designating the position and the region in the code-including image, including the unit of information codes, wherein the information code extracting member extracts the information codes on the basis of the position and the region designated by the position designating member.

9. The information code reading apparatus as claimed in claim 8, wherein the information code extracting member obtains desired information codes by combining a plurality of pieces of information codes to obtain a desired unit of information codes.

10. The information code reading apparatus as claimed in claim 7, wherein the color elements include cyan, magenta, yellow and black.

11. The information code reading apparatus as claimed in claim 7, wherein the color elements include red, green and blue.

* * * * *